United States Patent
Guilley et al.

(10) Patent No.: US 11,546,132 B2
(45) Date of Patent: Jan. 3, 2023

(54) DETECTION OF LASER FAULT INJECTION ATTACKS ON CRYPTOGRAPHIC DEVICES

(71) Applicant: SECURE-IC SAS, Cesson-Sevigne (FR)

(72) Inventors: Sylvain Guilley, Paris (FR); Michel Le Rolland, Ploermel (FR)

(73) Assignee: SECURE-IC SAS, Cesson Sevigne (FR)

( * ) Notice: Subject to any disclaimer, the term of this patent is extended or adjusted under 35 U.S.C. 154(b) by 0 days.

(21) Appl. No.: 17/251,159

(22) PCT Filed: Jun. 18, 2019

(86) PCT No.: PCT/EP2019/065955
§ 371 (c)(1),
(2) Date: Dec. 10, 2020

(87) PCT Pub. No.: WO2019/243299
PCT Pub. Date: Dec. 26, 2019

(65) Prior Publication Data
US 2021/0328761 A1 Oct. 21, 2021

(30) Foreign Application Priority Data
Jun. 19, 2018 (EP) ...................... 8305769

(51) Int. Cl.
*H04L 9/00* (2022.01)
*G06F 11/10* (2006.01)
*G06F 21/75* (2013.01)
*G06F 21/77* (2013.01)

(52) U.S. Cl.
CPC .......... *H04L 9/004* (2013.01); *G06F 11/1044* (2013.01); *G06F 21/75* (2013.01); *G06F 21/77* (2013.01); *G06F 2221/2135* (2013.01)

(58) Field of Classification Search
CPC ...... H04L 9/004; G06F 11/1044; G06F 21/75; G06F 21/77; G06F 2221/2135
USPC .......................................................... 713/189
See application file for complete search history.

(56) References Cited

U.S. PATENT DOCUMENTS

| | | | | |
|---|---|---|---|---|
| 5,377,347 A | * | 12/1994 | Hiiragizawa | G06F 1/14 713/502 |
| 2011/0029828 A1 | | 2/2011 | Bancel et al. | |
| 2015/0369865 A1 | * | 12/2015 | Hershman | H03K 19/003 326/8 |

OTHER PUBLICATIONS

Deshpande, et al., "Employing dual-complementary flip-flops to detect EMFI attacks", 2017 Asian Hardware Oriented Security and Trust Symposium (AsianHOST), pp. 109-114 Oct. 19, 2017.
Ei-Baze, et al., "A fully-digital EM pulse detector", Design, Automation & Test in Europe Conference & Exhibition (Date), pp. 439-444, Mar. 14, 2016.

(Continued)

*Primary Examiner* — Michael S McNally
(74) *Attorney, Agent, or Firm* — BakerHostetler

(57) ABSTRACT

Countermeasures against fault injection attacks of a cryptographic integrated circuit, and more specifically laser fault injection attacks are provided. The invention consists in generating sequences of bits belonging to a set of allowed sequences, and storing these sequences on a set of Flip-Flops. Then the sequences stored on the Flip-Flops are checked and, if they do not belong to the allowed sequence, this is the sign that a fault injection attack occurred and caused a bit flip in one of the flip-flops. An alarm signal is then generated.

16 Claims, 10 Drawing Sheets

(56) References Cited

OTHER PUBLICATIONS

Barenghi, et al., "Fault injection attacks on cryptographic devices: Theory, practice, and countermeasures", Proceedings of the IEEE, 100(11), 2012.

Breir, et al., "An Electromagnetic Fault Injection Sensor using Hogge Phase-Detector", 2017 18th International Symposium on Quality Electronic Design (ISQED), Mar. 2017.

* cited by examiner

DETECTION OF LASER FAULT INJECTION ATTACKS ON CRYPTOGRAPHIC DEVICES

CROSS-REFERENCE TO RELATED APPLICATIONS

This application is a National Stage of International patent application PCT/EP2019/065955, filed on Jun. 18, 2019, which claims priority to foreign European patent application No. EP 18305769.4, filed on Jun. 19, 2018, the disclosures of which are incorporated by reference in their entirety.

FIELD OF THE INVENTION

The present invention generally relates to the security of devices. More specifically, the invention relates to the detection of laser fault injection attacks on cryptographic devices.

BACKGROUND PRIOR ART

Cryptographic algorithms are employed in an increasing number of devices carrying sensitive information, such as smart cards, cell phones, set-top boxes, etc.

Cryptographic algorithms are used to ensure confidentiality, security, authentication, integrity, and privacy of digital data during its storage and/or transmission over insecure networks. They can be used also to secure transactions and exchanges between devices, secure payments, secure authentication of a device in a network, etc. . . . .

To protect sensitive information carried by a device from attacks, one or several encryption functions based on a cryptographic algorithm are usually implemented. An encryption function encrypts original data, or 'plaintext', using one or more encryption keys. The encryption process results in ciphered data, or 'ciphertext', which can be viewed in its original form only if it is decrypted with the suitable key(s).

Cryptographic algorithms, such as for example the DES (Data Encryption Standard) and AES (Advanced Encryption Standard) algorithms are based on secret keys which are unique for each user/device and allow the user/device to encrypt/decrypt messages or data securely.

Cryptographic algorithms can be implemented via integrated circuits (IC) which are generally of a small size, to be embedded within a device. For example, a UICC (Universal Integrated Circuit Card) card or a credit card comprises a cryptographic IC that is provided to secure transactions or communications using one or more cryptographic secret keys tied to a user or the like. The preservation of such secret keys from attacks is thus of paramount importance to enhance the security of a wide number of embedded devices.

To preserve secret keys, cryptographic keys are designed to be very difficult to break mathematically: an attacker seeking a secret key must execute a brute force analysis requiring that the attacker tries all possible secret keys. A cryptographic algorithm is accordingly designed to make such attacks require excessive time and resources to be effective.

However, other kinds of attacks, called "fault injection attacks", have emerged, to enable an attacker to obtain secret keys more rapidly. Fault Injection attacks consist in performing a hardware attack on an IC to obtain the secret key. A type of fault injection attack consists in inserting faults in the calculation of cryptographic ICs in order to generate a faulty result, and in analyzing the faulty result to obtain the secret key associated with an IC. Such analysis of the faulty result in order to infer information relative to the secret key is called DFA (Differential Fault Analysis). Protection against Fault Injection attacks is a major challenge for modern cryptographic devices, because such attacks drastically reduce the number of attempts necessary for an attacker to break a secret key embedded within a cryptographic IC. An overview of fault injection attacks and of existing countermeasures is provided in Barenghi, A., Breveglieri, L., Koren, I., & Naccache, D. (2012). Fault injection attacks on cryptographic devices: Theory, practice, and countermeasures. *Proceedings of the IEEE,* 100(11), 3056-3076.

Laser fault injection is a type of fault injection attack which is particularly powerful. Laser fault injection consists in sending laser beams at specific points of an IC in order to generate bit errors during cryptographic calculation, thereby injecting fault in the cryptographic calculation. Although expensive, laser fault injection attacks are known as very powerful attacks due to their efficiency in injecting faults at very precise locations of the ICs. Further, fault injection attacks can be reproduced very accurately.

For example, many cryptographic ICs consist in interconnected Flip-Flops (FFs) that perform encryption/decryption. Each FF stores a binary value. The FFs are synchronized using a clock. The binary value of each FF is updated at each clock signal (usually at the rising front of the clock signal) depending on a combination of binary values of other FFs that are connected to its input ports. The interconnection of FFs allows the executing encryption and decryption using a secret key, usually stored in an external memory that may be protected by a Physically Unclonable Function (PUF) or a One Time Programmable (OTP) master key. The key is transmitted to the cryptographic circuit through a bus. The laser fault injection attacks are able to target a single FF, to inject a bit fault during calculation. The bit fault may consist in artificially setting the value of the FF on 0 or 1, or perform a bit flip.

Laser fault injection attacks are generally performed in two main steps. A first calibration step consists in performing fault injections in random or pseudo random locations of the IC, to identify the most sensitive FFs that are the FFs that shall be attacked to break the secret key. A second step consists in actually performing fault injections in the sensitive FFs, in analyzing the faulty results, and then decrypting the secret key. Laser fault injection attack is powerful in that it can be replicated easily on the ICs of the same model/manufacturer. This is because the topologies of the ICs that belong to the same model (for example, UICC cards of the same model) are identical, while only the secret key (SIM key in this example) that is used by the IC changes. Therefore, once the calibration step has been performed, and the sensitive FFs of a circuit have been identified, a fault injection attack can be reproduced in a quite simple way on the IC of the same model, to retrieve each of the secret key stored within each IC.

A laser fault injection attack may be performed either from the front (front-side attack), or from the back (backside attack) of the IC. In each case, the wavelength of the laser beam shall have specific values. In case of a front-side attack, the wavelength of the laser beam must be at least 800 nm in order to have enough energy to inject a fault. In case of a backside attack, the wavelength of the laser beam must be substantially equal to 1064 nm, because it is the only wavelength that the silicon substrate of the IC is transparent to, and thus the only wavelength allowing a laser fault injection from the back of the IC.

A number of countermeasures are known to protect an IC from a laser fault injection attack.

For example, a shield can be placed on top of the IC in order to prevent laser beams from reaching it. However, such solution is costly and does not protect the IC from back-side attacks.

Another countermeasure consists in placing an analog light sensor in the IC to detect a laser beam and protect the circuit (for example by stopping the execution of encryption/decryption or submitting erroneous results), in case of a detected laser beam. This solution has the advantage of ensuring that no successful laser fault injection can be performed in areas of the ICs where the laser beam can be detected by the sensor. However, the analog sensor is usually not able to sense light on the complete surface of the IC. Accordingly, a laser fault injection occurring in areas of the ICs far away from the sensors may not be detected. In addition, such sensors are often large and thus occupy an important surface that may be otherwise used for calculation logics and/or allow a reduction of the size and consumption of the IC. The analog sensor may also be easily detected by an attacker.

In some existing approaches, it is known to replace the analog sensor by a digital light sensor. The digital sensor is smaller than the analog sensor, allowing to optimize the occupied size. However, it can still be detected by an experienced attacker. In addition, even though the laser detection is generally efficient, it is very difficult to quantify the protection offered by the digital sensor. It is thus, using analog or digital light sensor solutions, very difficult to define with a reasonable certainty the areas of the ICs that is actually protected (i.e. the areas of the IC where a laser beam will be detected by the digital sensor).

Therefore, prior art countermeasures for laser fault injection attacks, have the disadvantage of being incomplete, impossible to quantify, and/or costly.

There is accordingly a need for a cryptographic device that is able to detect laser fault injection attacks on a whole cryptographic IC with a defined certainty, at a reasonable cost.

SUMMARY OF THE INVENTION

To this effect, the invention discloses a cryptographic integrated circuit (IC) comprising: one or more processing logics configured to generate one or more sequences of bits belonging to a set of allowed sequences; a set of Flip-Flops (FFs) comprising two or more Flip-Flops configured to store said sequences of bits; one or more processing logics configured to generate a signal indicating an occurrence of a fault injection attack if a sequence of bits defined by the bits stored by the two or more FFs of the set does not belong to the set of allowed sequences.

Advantageously, the Hamming distance between two different sequences belonging to the set of allowed sequences is at least equal to two.

Advantageously, the set of allowed sequences comprises two sequences, the first sequence of the set being the complement of the second sequence of the set.

Advantageously, the one or more processing logics configured to generate one or more sequences of bits belonging to a set of allowed sequences comprise said two or more FFs configured to store said sequences of bits, and one or more logical gates connected to generate a different sequence of bits belonging to the set of allowed sequences at each clock cycle; the one or more processing logics configured to generate a signal indicating the occurrence of a fault injection attack comprise one or more logical gates configured to perform logical operations to generate a predefined signal if the sequence of bits at the outputs of the two or more FFs configured to store said sequences of bits does not belong to the set of allowed sequences.

Advantageously, at least one of the FFs has an input which is the complement of its output.

Advantageously, the cryptographic integrated circuit (IC) comprises at least one first FF, whose output is connected to the input of at least one second FF, and the input of a NOT logical gate, the output of said NOT logical gate being connected to the input of said first FF.

Advantageously, the cryptographic integrated circuit (IC) comprises: a first FF and a second FF to store said sequences of bits; a NOT logical gate; a XNOR logical gate; wherein the output of the first FF is connected to the input of the NOT logical gate, to the input of the second FF and to a first input of the second XNOR logical gate; the output of the NOT logical gate 411a is connected to the input of the first FF; the output of the second FF is connected to a second input of the XNOR logical gate; the signal indicating the occurrence of a fault injection attack is an output of the XNOR logical gate equal to 1.

Advantageously, the cryptographic integrated circuit (IC) comprises a plurality of FFs connected on the same clock signal, the output of each of the FFs being respectively negated and connected to its input.

Advantageously, the cryptographic integrated circuit (IC) comprises: an error-correcting code encoder configured to generate the one or more sequences of bits, the set of allowed sequences comprising error-free codes; a set of FFs configured to store the one or more sequences of bits at the output of the error-correcting code encoder; an error-correcting code decoder configured to decode the code stored in the set of FFs, and to generate the signal indicating the occurrence of a fault injection attack if said code stored in the set of FFs comprises an error.

Advantageously, the error-correcting code is a Hamming code.

Advantageously, the cryptographic integrated circuit (IC) comprises a security manager configured to modify the output of an execution of a cryptographic algorithm, in response to the reception of the signal indicating the occurrence of a fault injection attack.

Advantageously, the security manager is configured to count a total number of fault injections, and modify the output of the execution of the cryptographic algorithm, in response to the reception of the signal indicating the occurrence of a fault injection attack depending on the total number of fault injections.

Advantageously, the security manager is configured to disable the cryptographic integrated circuit (IC), if the total number of fault injections is higher than or equal to a predefined threshold.

Advantageously, the cryptographic integrated circuit (IC) further comprises one or more sensors, configured to detect a global fault injection attack performed on the integrated circuit (IC).

Advantageously, said one or more sensors comprises at least one sensor selected in the group consisting of: an analog or digital light sensor configured to detect a light or laser fault injection attack; a voltmeter configured to detect a fault injection attack based on a modification of the voltage of the integrated circuit (IC); a temperature sensor configured to detect a fault injection attack based on an overheating of the integrated circuit (IC); a clock sensor configured to detect a fault injection attack based on a modification of the clock of the integrated circuit (IC).

The invention also discloses a method for detecting a fault injection attack performed on a integrated circuit (IC), said integrated circuit (IC) comprising a set of Flip-Flops (FFs), wherein the method comprises: generating one or more sequences of bits belonging to a set of allowed sequences; storing said sequences of bits in a set of said Flip-Flops (FFs) comprising two or more Flip-Flops; generating a signal indicating the occurrence of a fault injection attack if a sequence of bits defined by the bits stored by the two or more FFs of the set does not belong to the set of allowed sequences.

The invention also discloses a computer program product for detecting a fault injection attack performed on a integrated circuit (IC), said integrated circuit (IC) comprising a set of Flip-Flops (FFs), the computer program product comprising: a non-transitory computer-readable storage medium; and program code stored on the non-transitory computer-readable storage medium that, when executed by one or more processors, causes the one or more processors to: generate one or more sequences of bits belonging to a set of allowed sequences; store said sequences of bits in a set of registers comprising two or more register; generate a signal indicating the occurrence of a fault injection attack if a sequence of bits defined by the bits stored by the two or more registers of the set does not belong to the set of allowed sequences.

The disclosure allows to accurately define the areas of an integrated circuit to protect, and quantify a level of protection.

The disclosure further allows the determination, for an IC, of a level of certification characterizing its protection against fault injection attacks.

The disclosure also provides a solution at a very low cost, while not requiring a calibration phase.

The disclosure can be used in addition to other protection solutions.

Another advantage of the various embodiments of the disclosure is that they do not generate false positive alarms.

Further, an attacker is unable to detect if an integrated circuit is protected by the disclosure.

In the future, as the flip-flops will be further miniaturized while the constraints relative to laser wavelength will remain the same, the probability that a laser beam will, when hitting a sensitive flip-flop, also hit nearby flip-flops including landmine flip-flops will increase. The level of protection provided by the disclosure using a defined number of flip-flops is therefore expected to increase in the future.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

Figure 1:
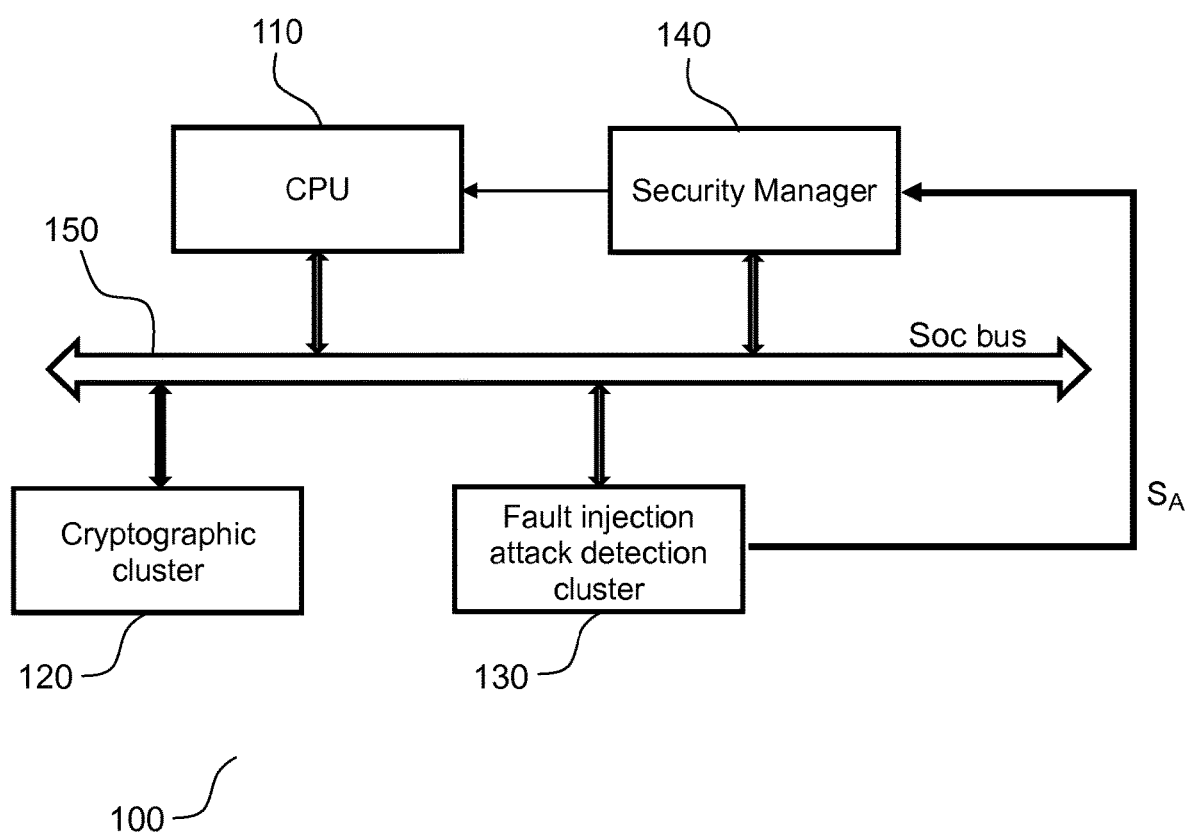
FIG. 1 depicts an example of a cryptographic integrated circuit, in a number of embodiments of the invention.

Referring to FIG. 1, there is shown an example of a cryptographic integrated circuit, according to some embodiments related to the disclosed solution.

The integrated circuit (IC) 100 (also referred to as a "cryptographic IC") is configured to implement cryptographic functions. The IC 100 may be used for any application that requires cryptography. For example, the IC 100 may be used to perform secure authentications, or secure transactions.

The IC 100 may be for example a SoC (System on Chip). However, the invention may be embedded within other kinds of ICs such as Systems-in-Package (SiP) or Systems-on-Package (SoP).

The cryptographic IC 100 may comprise a processor 110, a cryptographic cluster 120 running a cryptographic algorithm, a fault injection attack detection cluster 130, and a security manager 140, as well as a bus 150 configured to ensure communication between the previous components. The processor 110 can send commands to the cryptographic cluster 120 to demand to encrypt a message with a key through the bus 150. The security manager may be for example a software running on the processor, or an independent hardware cluster.

The cryptographic cluster 120 and the fault injection attack detection cluster 130 both rely on calculations executed by Flip-Flops (FFs) of the ICs. Fault injection attacks, and more specifically laser fault injection attacks are based on the injection of bit flips of FFs executing the cryptographic algorithm to analyze the faulty results. According to some embodiments, the fault injection attack detection cluster 130 may comprise a set of two or more FFs. Further, the fault injection attack detection cluster 130 may be configured to emit an alarm signal $S_A$, indicating the occurrence of a fault injection attack, if the bit represented by at least one of the FFs of the set of FFs has been changed, for example by being hit by a laser beam during a laser fault injection attack. The fault injection attack detection cluster 130 is thus suitable to detect any attack that relies on the injection of fault in a FF using radiation injection, such as for example a laser fault injection attack, a light fault injection attack, or an electromagnetic fault injection attack.

In response to the detection of an attack and to the emission of an alarm signal $S_A$ by the fault injection attack detection cluster 130, the alarm signal may be sent to the security manager 140. The security manager 140 can be configured to respond to alarm signals in different ways. The security manager 140 may be configured to modify the output of the cryptographic algorithm executed by the cryptographic cluster 120 so that the faulty result expected by the attacker is not transmitted. To this effect, it is possible to simply no transmit any result, or transmit a faulty result (for example a random value). Accordingly, the current attack attempt is failed. Transmitting a faulty result advantageously let the attacker believe that the attack has not been detected.

The modification of the output of the cryptographic algorithm may be performed in different ways according to embodiments of the invention. For example, the execution of the cryptographic algorithm can be simply stopped. Alternatively, the result of the calculation can be obfuscated/corrupted, or the security manager 140 may reset the IC 100.

During a fault injection attack, a plurality of successive fault injections is generally performed by the attacker in order to identify the sensitive FFs that allow breaking the secret key. In some embodiments, the security manager 140 may be configured to count the number of fault injections using a counter, for example by incrementing the counter each time an alarm signal is received. The security manager 140 may then adapt the response to the fault injection attack, depending on the number of faults injections that have already been performed. For example, at the first fault injection, the execution of the cryptographic algorithm can be simply stopped or random value sent as a result while, at subsequent injections, stronger responses may be performed such as, for example, if the number of fault injections detected corresponds to a predefined maximum number of fault injections, the security manager 140 may definitively disable the IC 100. The security manager 140 may also be configured to temporarily disable the IC 100, so that no other attack can be performed during a predefined amount of time. This amount of time may increase drastically over the time.

This allows tailoring the responses according to the intensity of the attack. For example, the security manager 140 may be configured to disable the IC 100 only if a severe attack performed by an experienced attacker is detected. However, the security manager 140 ensures that the attacker will not be able to analyze the faulty result if a fault injection is detected, in all situations.

It should be noted that the invention is not limited to such example and encompasses any suitable means to prevent an attacker from obtaining the faulty result when a fault injection attack is detected.

Figure 2A:
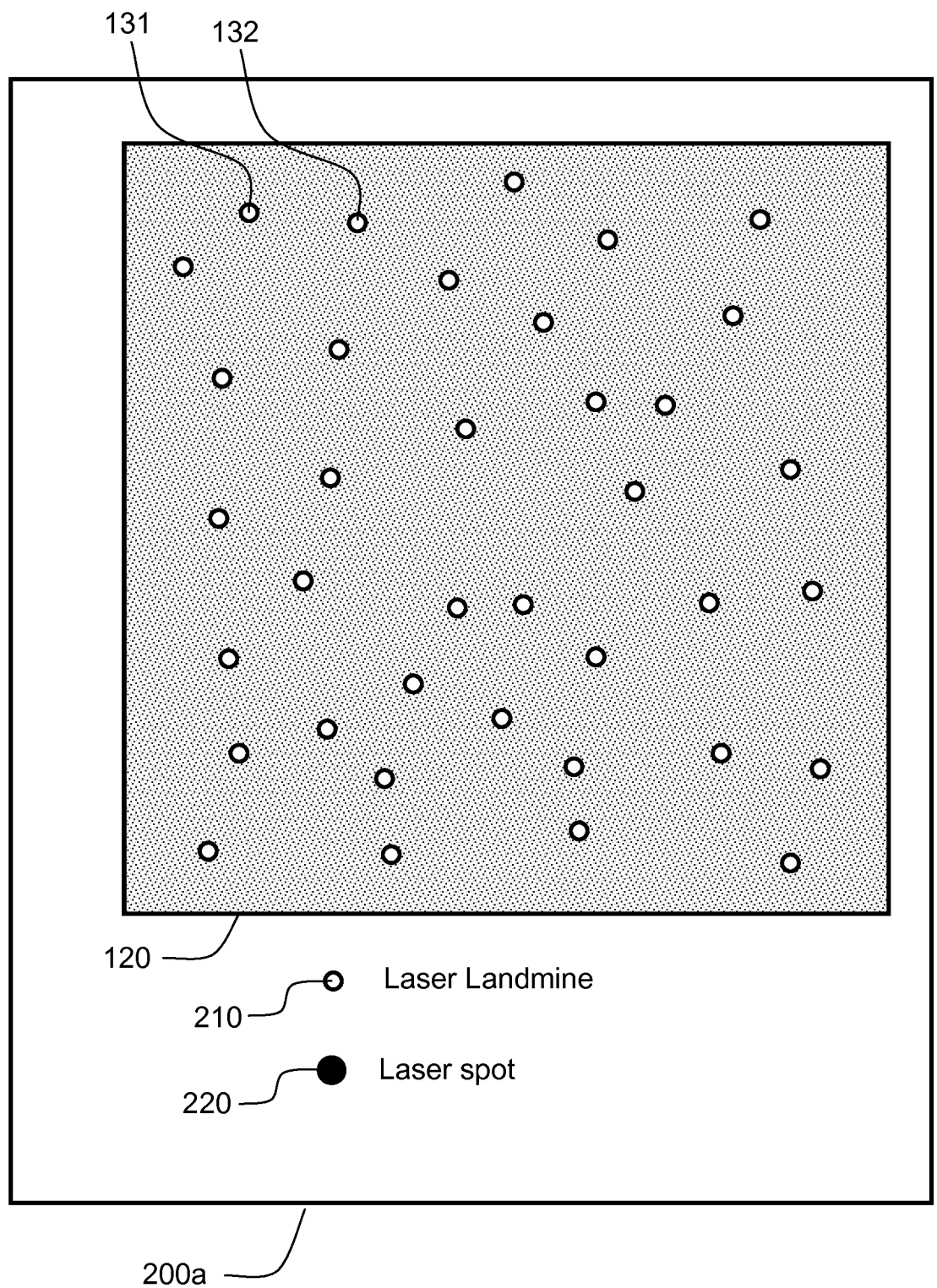
FIGS. 2a and 2b depicts two examples of localizations of flip-flops of a fault injection attack detection cluster, in some embodiments of the invention.
Figure 2B:
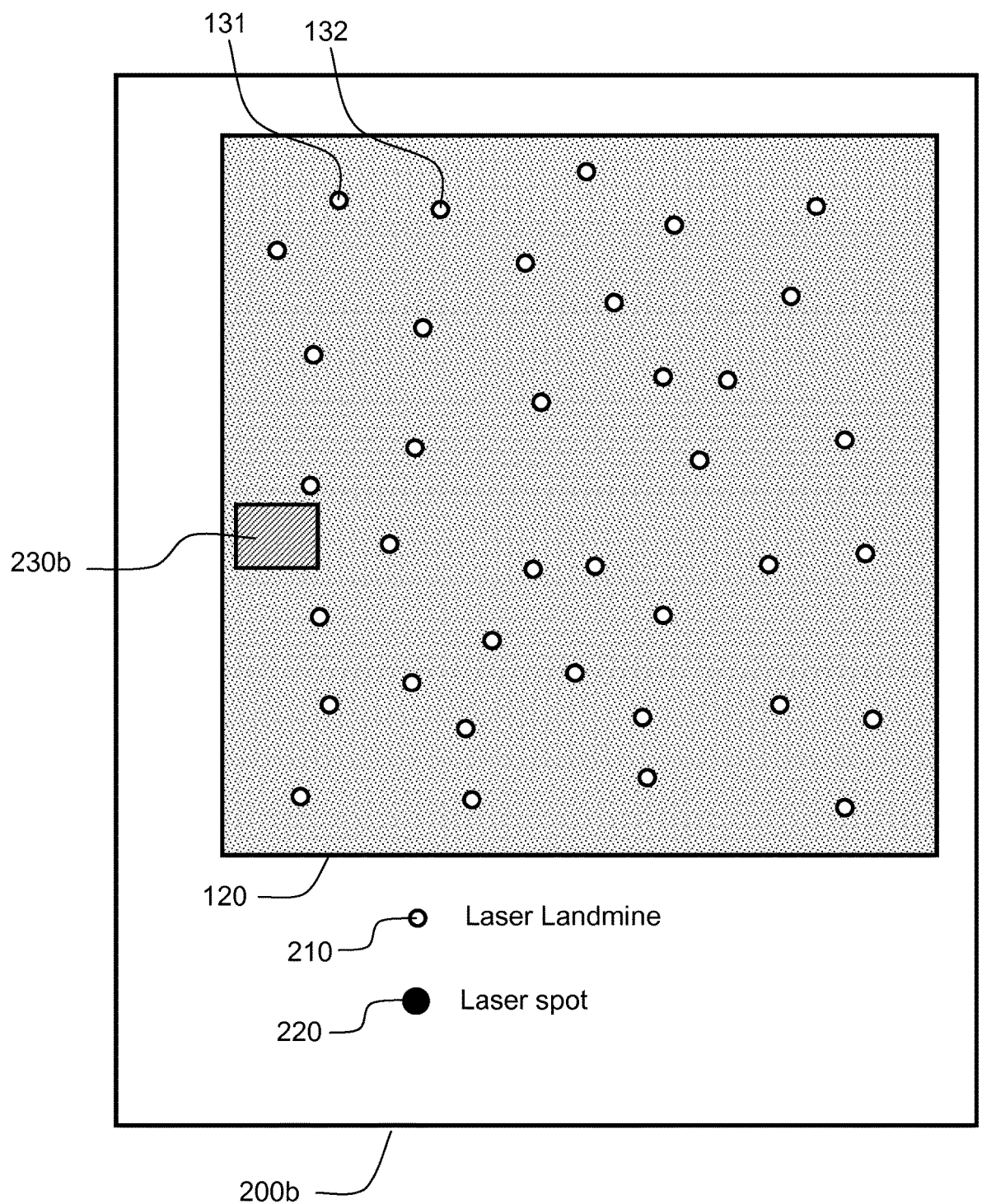

FIGS. 2a and 2b respectively depict two examples of flip-flops localizations of a fault injection attack detection cluster, according to some embodiments of the invention.

With reference to FIG. 2a, the cryptographic IC 100 is implemented in the form of a cryptographic IC 200a. Each of the circles shown in FIG. 2a, such as for example the circle 210, represents a FF of the fault injection attack detection cluster 130. For examples, the FFs 131 and 132 belong to the fault injection attack detection cluster 130. As can be seen in FIG. 2a, such FFs can be placed all around the IC 200a. The FFs of the fault injection attack detection cluster 130 will be also referred to hereinafter as "laser landmines" or "landmines" as in case of a laser attack, if the laser beam hits one of the FFs of the fault injection attack detection cluster 130, an alarm signal $S_A$ is generated and the security manager 140 causes detection of the attack and the performance of appropriate actions.

The embodiments of the invention advantageously allow a quantification of the protection brought to the IC 200a in case of a laser fault injection attack. More specifically, a protection ratio can be defined as:

$$P_{rat} = \frac{N_{mine}}{N_{FF}} * \left( ceil\left( \frac{\pi * \left(\frac{l}{2}\right)^2}{s} \right) \right) \quad \text{(Equation 1)}$$

In Equation 1:
$N_{mine}$ designates the number of laser landmines, i.e the number of FFs of the fault injection attack detection cluster 130;
$N_{FF}$ designates the total number of FFs of the IC cryptographic cluster 120;
l designates the radius of the laser beam, the radius of the laser beam being at least equal to the wavelength of the laser beam;
S designates the surface of a FF.

Equation 1 can be interpreted in the following way: When an attacker performs a laser fault injection attack, the attacker does not have an a priori knowledge of the FFs that are used for cryptographic calculations or fault injection detection (assuming that the attacker even knows that the IC 100 performs fault injection detection). The ratio of the surface occupied by landmine FFs compared to the total surface of the FF is $$\frac{N_{mine}}{N_{FF}}.$$

In addition, the surface hit by laser beam depends on the wavelength of the laser beam, and is equal to $$\pi * \left(\frac{l}{2}\right)^2,$$

because the laser beam hits a circle having a diameter equal to the wavelength of the laser. The FF has a surface equal to S. Therefore, each time a laser beam hits the IC 200a, the laser beam will hit in average $$ceil\left( \frac{\pi * \left(\frac{l}{2}\right)^2}{s} \right)$$

FFs, with each FF having a probability $$\frac{N_{mine}}{N_{FF}}$$

of being a landmine.

The level of protection provided by the various embodiments of the invention can thus be measured according to the number of FFs that are used by the fault injection attack detection cluster 130. In addition, the invention allows determining the areas of the circuits that are protected and to reach a desired level of protection by setting the appropriate level of laser landmines. In some embodiments, it is possible to still increase the protection by placing the laser landmines with respect to the most sensitive FFs of the cryptographic cluster 120 (i.e the FFs that are the most crucial FFs of the cryptographic calculations), in order to increase the probability of detecting an attack if a sensitive FF is hit. In particular, such increased protection may be obtained by placing the laser landmines in the neighborhood of the most sensitive FFs of the cryptographic cluster 120.

The quantification of the protection thus allows a determination with a defined certainty of the likelihood of each attempt to be detected. Therefore, it is possible to certify the IC against fault injection attacks.

The circle 220 represents the size of an area hit by a laser beam. As shown in FIG. 2a, the size of the circle 220 is larger than the size of a FF. This is due to the fact that the wavelength of the laser beams are generally equal to 800 nm for a front-side attack, and to 1064 nm for a back-side attack, while FFs generally have an average height of approximately 400 nm, which is much lower than the diameter of the circle hit by a laser beam. When an attacker hits a sensitive FF, the likelihood of hitting a neighbor landmine is thus high.

It should be noted that the level of protection provided by the embodiments of the invention is expected to increase over time with the expected changes in FF sizing. For example, the average height of FFs is expected to reduce over time in the future, while the wavelength of laser beams required to perform laser fault injection attacks is not expected to be modified. Therefore, as ICs and FFs will be further miniaturized, it will become much harder for attackers to hit a sensitive FF without hitting a nearby landmine.

It is also an advantage of the embodiments of the invention to provide a good protection at low costs, the cost of using FFs as landmines being almost null. In addition, it is virtually impossible for an attacker to detect, before the attack, that the protection according to the embodiments of the invention is used, because the FFs that belong to the cryptographic cluster 120 cannot be distinguished from FFs that belong to the fault injection attack detection cluster 130. It is only possible to infer that a protection according to the disclosure has been used after the attack has failed.

In addition, the fault injection attack detection cluster of the invention advantageously does not require any calibration phase.

With reference to FIG. 2b, there is shown another example of localizations of flip-flops of a fault injection attack detection cluster, according to some embodiments.

In FIG. 2b, the cryptographic IC 200b is similar to the cryptographic IC 200a, but further comprises a global attack detector 230b. The global attack detector 230b may be any detector that detects a global fault injection attack. A global fault injection attack is a fault injection attack that creates disturbances on global parameters of the IC, such as voltage, clock, temperature, etc. . . . . For example, the global attack detector 230b may be a voltmeter, a temperature sensor or a clock sensor. Such global attack detector may thus detect a number of global fault injection attacks (i.e fault injection attacks that modify the behavior of the whole IC) such as for example attacks based on a variation of supply voltage, on a modification of clock frequency, on overheat, etc.

In response to the detection of a global attack, the security manager 140 may modify the output of the cryptographic algorithm and/or the behavior of the IC, on the same principle as explained hereinbefore. Accordingly, the method and system for detecting fault injection, according to embodiments of the invention, can be used in combination with any other countermeasure for fault injection attack.

It should be noted that the invention is not limited to the above listed exemplary sensors and may use any sensor or combination of sensors that is suitable to globally detect a fault injection attack. More than one sensor and/or one type of sensor can be used. For example, the IC 230b may comprise a voltage and a temperature sensor; two light sensors in two different places, etc.

Figure 3A:
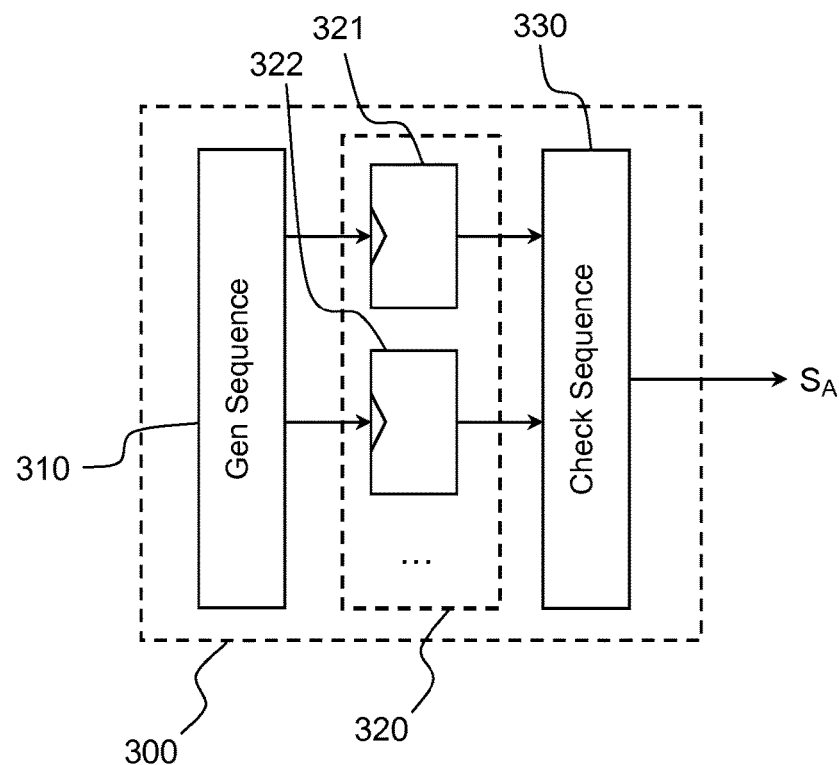
FIGS. 3a and 3b respectively depict two block diagrams of a fault injection attack detection cluster in a number of embodiments of the invention.
Figure 3B:
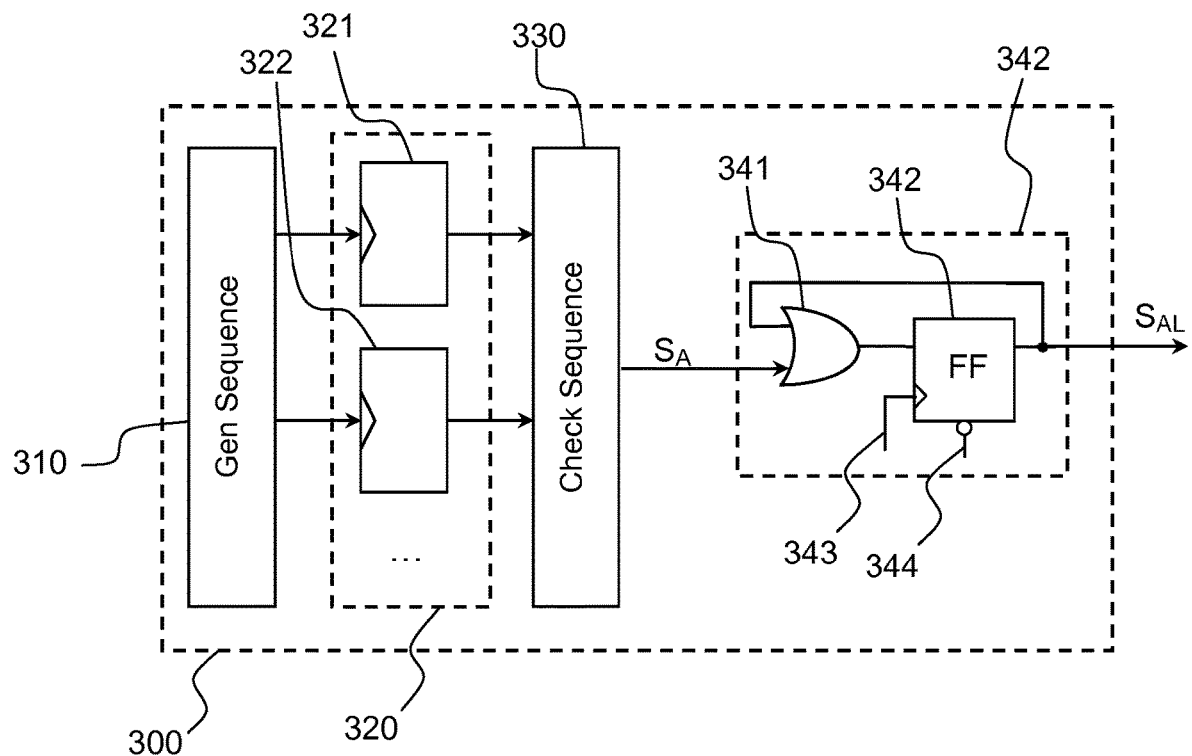

FIGS. 3a and 3b respectively depict two block diagrams of a fault injection attack detection cluster in a number of embodiments of the invention.

FIG. 3a shows a block diagram of a fault injection attack detection cluster, according to embodiments of the invention.

The fault injection attack detection cluster 300 may be incorporated within an integrated circuit, which may be for example part of the SoC 100. As noted above with reference to FIGS. 2a and 2b, the fault injection attack cluster 300 comprises a plurality of FFs which may be part of the FFs used by the cryptographic algorithms. Some FFs may thus be used simultaneously for both the cryptographic algorithms and fault injection attack detection.

As shown in FIG. 3, the fault injection attack detection cluster 300 may comprise one or more sequence generation processing logics 310, configured to generate one or more sequences of bits belonging to a set of allowed sequences. According to various embodiments of the invention, a processing logic may be any logic suitable for performing calculations or operations in accordance to inputs, such as logic gates, flip-flops, a processor operating in accordance with software instructions, a hardware configuration of a processor, or a combination thereof.

The one or more processing logics 310 may be configured to generate a different sequence of bits at each clock signal, for example at the rising front of a clock signal. The sequences of bits generated by the one or more sequence generation processing logics 310 belong to a set of allowed sequences. Accordingly, if the sequence comprises n bits, all or only a subset of the $2^n$ possible sequences may be generated.

Any suitable means allowing generation of sequences of bits that belong to a set of allowable sequences can be used by the invention. For example, sequences can be generated according to a predefined set of allowed sequences.

The fault injection detection cluster 300 may further comprise a set of FFs 320 comprising two or more FFs 321, 322 to store the sequence of bits generated by the one or more processing logics 310. Although FIG. 3a shows a set 320 comprising two FFs 321, 322 to store the sequences of bits, the skilled person will readily understand that more FFs may be used, the number of FFs being at least equal to the number of bits in the sequences. In some embodiments, the fault injection attack detection cluster can thus comprise a higher number of FFs.

The fault injection attack detection cluster 300 may further comprise one or more sequence check processing logics 330 configured to detect if the bit sequence defined by the bits stored by the set of FFs 320 belongs to the set of allowed sequences. If it does not belong to the set of allowable sequences, the sequence check processing logics 330 may be configured to generate a signal $S_A$ indicating the occurrence of a fault injection attack.

As a result, if no fault injection attack occurred, the bits stored by the FFs of the set of FFs 320 are not modified and the sequence defined by them belongs to the set of allowed sequences. In contrast, if a fault injection attack occurred, such as for example a laser fault injection attack, and if the injection attack hit one of FFs of the set of FFs 320 and changed the bit stored by the hit FF, the sequence of bits defined by the FFs of the set of FFs 320 does not belong anymore to the set of allowed sequences.

Thus, an attack signal $S_A$ will only be generated if a fault injection attack occurred. The invention thus avoids false positives.

Embodiments of the invention thus make it possible to detect a fault injection attack, including any kind of fault injection attacks based on radiations (laser, light, electromagnetism), if at least one of FFs of the set 320 is hit.

In some embodiments, the FFs may be associated with an oscillator, which may be for example created by coupling FFs clocked by the rising edge of the clock, and FFs clocked by the falling edge of the clock, as proposed by Breier, J., Bhasin, S., & He, W. (2017, March). An electromagnetic fault injection sensor using Hogge phase-detector. In Quality Electronic Design (ISQED), 2017 18th International Symposium on (pp. 307-312). IEEE. This increases the ability of the IC to detect electromagnetic fault injections.

In one embodiment, the Hamming distance between two different sequences of bits of the set of allowed sequences is at least equal to the number of bits in the sequence. This means that any pair of sequences of bits in the set of allowable sequences does not have any bit in common. Thus, if a fault injection attack performs a bit flip of a single FFs in the set 320, the resulting sequence of bits cannot belong to the set of allowed sequences. Therefore, an attack is required to hit at least two FFs of the cluster at the same time in order not to be detected. Assuming that an attacker does not have any a priori knowledge of the FFs that belong to the detection cluster (even if the attacker is further aware that there is a fault injection attack detection cluster), the probability for the attacker to hit two FFs in order to generate another sequence of bits belonging to the set of allowed sequences if extremely low. The invention thus advantageously allows a detection of any fault injection attack where at least one FF from the set of FFs 320 is hit.

It should be noted that the probability of having an undetected attack may be lowered by using higher Hamming distances: for example, certain sets of allowable sequences would require at least 3 FFs to be hit at the same time for an attack to remain undetected, while other would require at least 4 FFs to be hit, etc.

Therefore, in a number of embodiments of the invention, the fault injection detection cluster comprises at least 3 FFs, and the Hamming distance of the set of allowed sequences is at least 3. This means that, in order for an attack to remain undetected, the attacker needs to hit, in a synchronized manner, at least 3 FFs. More generally, this introduces a redundancy that renders the landmine more resistant to higher level attacks, and greatly increases the ability of the system to detect fault injection attacks.

It should be further noted that any suitable means for verifying whether the sequence of bits defined by the set of FFs 320 belongs to the set of allowable sequences that can be used according to embodiments of the invention. For example, the one or more sequence check processing logics 330 may be configured to verify if the sequence belongs to a predefined set of allowed sequences. Alternatively, the allowed sequences may share certain properties and the one or more sequence check processing logics 330 may verify if the properties are fulfilled.

In a number of embodiments of the invention, all the FFs of the set 320 are synchronized by the same clock signal. Therefore, their values are updated substantially at the same time, and an attack can be detected without delay. The values of the FFs can for example be updated on the rising front of the clock signal.

In a number of embodiments of the invention, the clock signal is the same for all the FFs of the circuit. In other embodiments of the invention, the FFs of the fault injection detection cluster, such as the FFs 320 are synchronized on a different clock than the other FFs of the circuit. This allows synchronizing landmine FFs on a clock with a different frequency than the other FFs. For example, the landmine FFs can be synchronized on a clock with higher frequency than the other FFs. Therefore, their values are updated more frequently, and a fault injection error can be detected more rapidly. Meanwhile, the clock frequency of the other FFs of the circuit is not increased, which prevents a significant increase of the energy consumption of the circuit.

In a number of embodiments of the invention, it is also possible, in order to reduce the energy consumption of the circuit, to disable on demand the fault injection detection. For example, the landmine FFs can be disabled through a disable signal. Alternatively, if the landmine FFs are synchronized on a separate clock, a clock-gating can be used, by stopping the oscillation of the clock in order to stop the execution of the operation of the FFs.

In a number of embodiments of the invention, the FFs of the fault injection detection cluster, such as the FFs 320, can be powered using a lower voltage than the other FFs. Indeed, a FF powered with a lower voltage is more sensitive to fault injections. Therefore, the relative sensibility of the landmine FFs to a laser attack becomes higher than the sensibility of the other FFs of the circuit, which increases their ability to detect an attack.

The landmine FFs can also be selected as being of a different type than the other FFs of the circuit. For example, the kind of transistors used to produce a FFs have an impact on the behavior of the FFs. The landmine FFs can be for example selected as having a low driver strength, i.e the transition between two states of the FFs is slow. This also increases the relative sensibility of the landmine FFs to fault injection attacks.

FIG. 3*b* shows a block diagram of a fault injection attack detection cluster, according to embodiments of the invention.

In a number of embodiments of the invention, the fault injection detection cluster 300 comprises at least one processing logic 340 to store the alarm signal. Thus, when an alarm signal is raised, even if the FFs 320 exhibit allowed sequences at subsequent iterations, the circuit retains the information that an alarm has been raised: the alarm signal is thus locked, and remain active even if the FFs 320 exhibit allowed sequences at subsequent iterations.

The alarm signal can be locked in different ways. In one example, the alarm signal $S_A$ is injected as a first input of an "or" gate 341, whose output if a further FF 342. The output of the further FF 342 is connected to the second input of the "or" gate 341. Thus, when no alarm was raised, the alarm signal $S_A$, and the further FF 342 both hold the value "0". The further FF 342 outputs a locked alarm signal $S_{AL}$, which has the value "0" in this case. The "or" gate 341 thus has two "0" inputs, and outputs a "0" which does not modify the state of the further FF 342, until a first alarm signal is raised. If an alarm is raised, the signal $S_A$ gets the value "1", the output of the "or" gate 341 also becomes 1, and, at the next clock signal, the further FF 342 takes the value "1". Afterwards, the output of the further FF 342 remains 1, because it serves as an input to the "or" gate 341, which therefore always outputs a "1", even if the FFs 320 exhibit an allowed sequence, and the alarm signal $S_A$ gets back to the value 0. The locked alarm signal $S_{AL}$ therefore remains 1 even if the alarm signal $S_A$ gets back to 0. Thus, a single alarm is sufficient to lock the value of the further FF to 1, and preserve the information, that an alarm was raised.

The further FF 342 may also receive a clock signal 343, which may be the same as the clock signal provided to the FFs 320, and a reset signal 344 that may be used to reset the value of the further FF 342 to 0, in order to unlock the signal.

FIGS. 4*a* to 4*c*, and 5 depict an exemplary generation of allowed sequences using auto-generated sequences or an error correcting code.

Figure 4A:
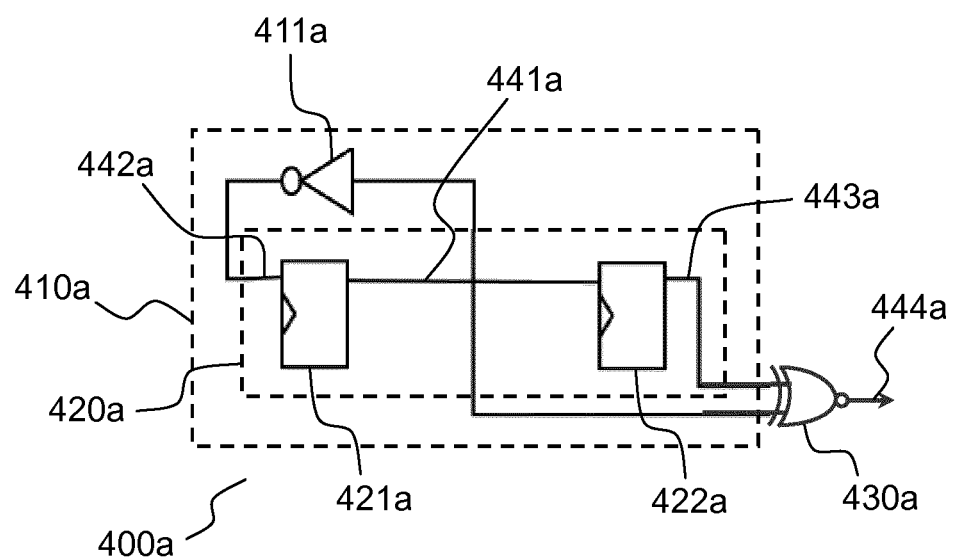
FIGS. 4a, 4b and 4c respectively depict three examples of fault injection attack detection clusters, in some embodiments of the invention.
Figure 4B:
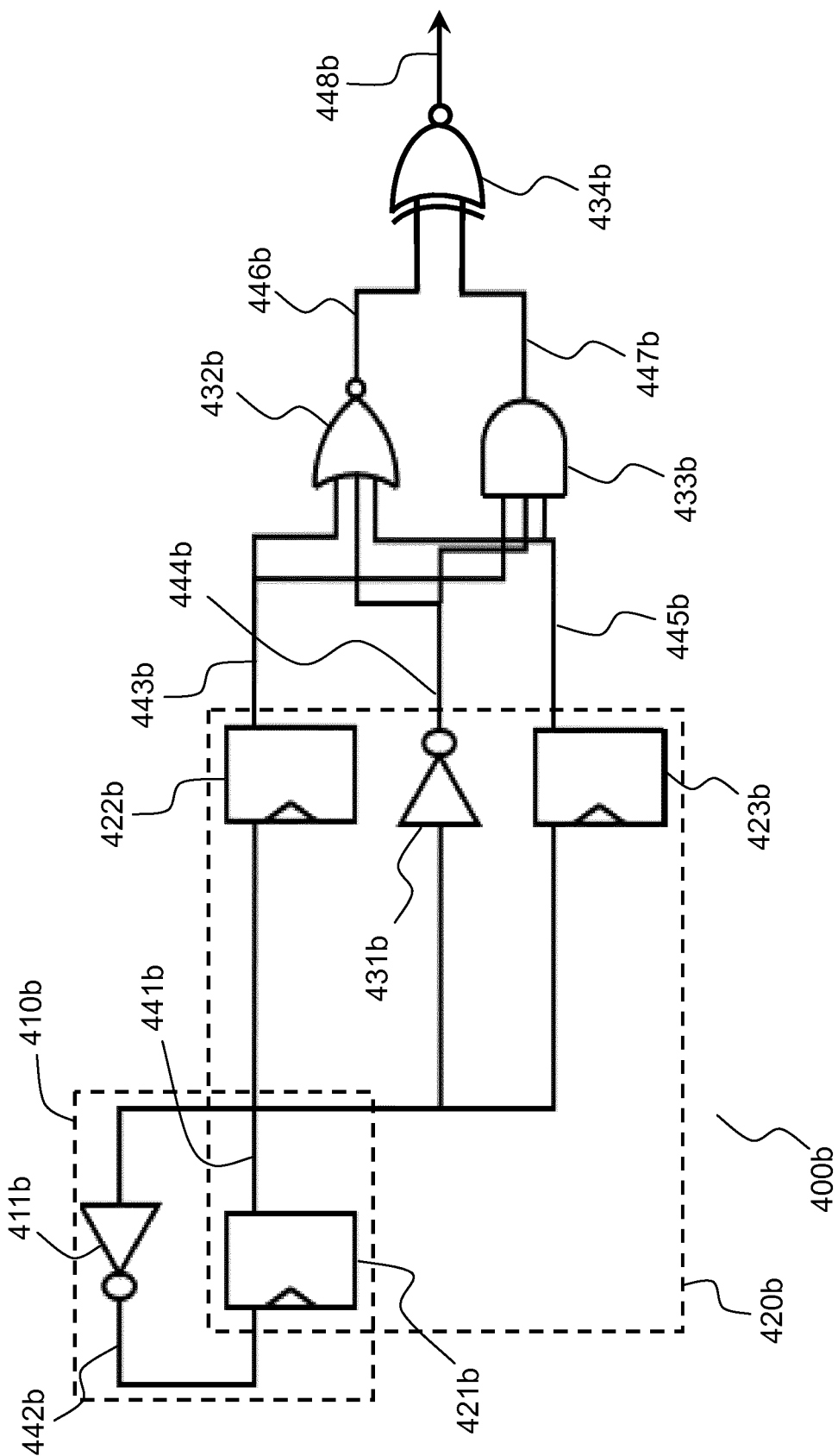
Figure 4C:
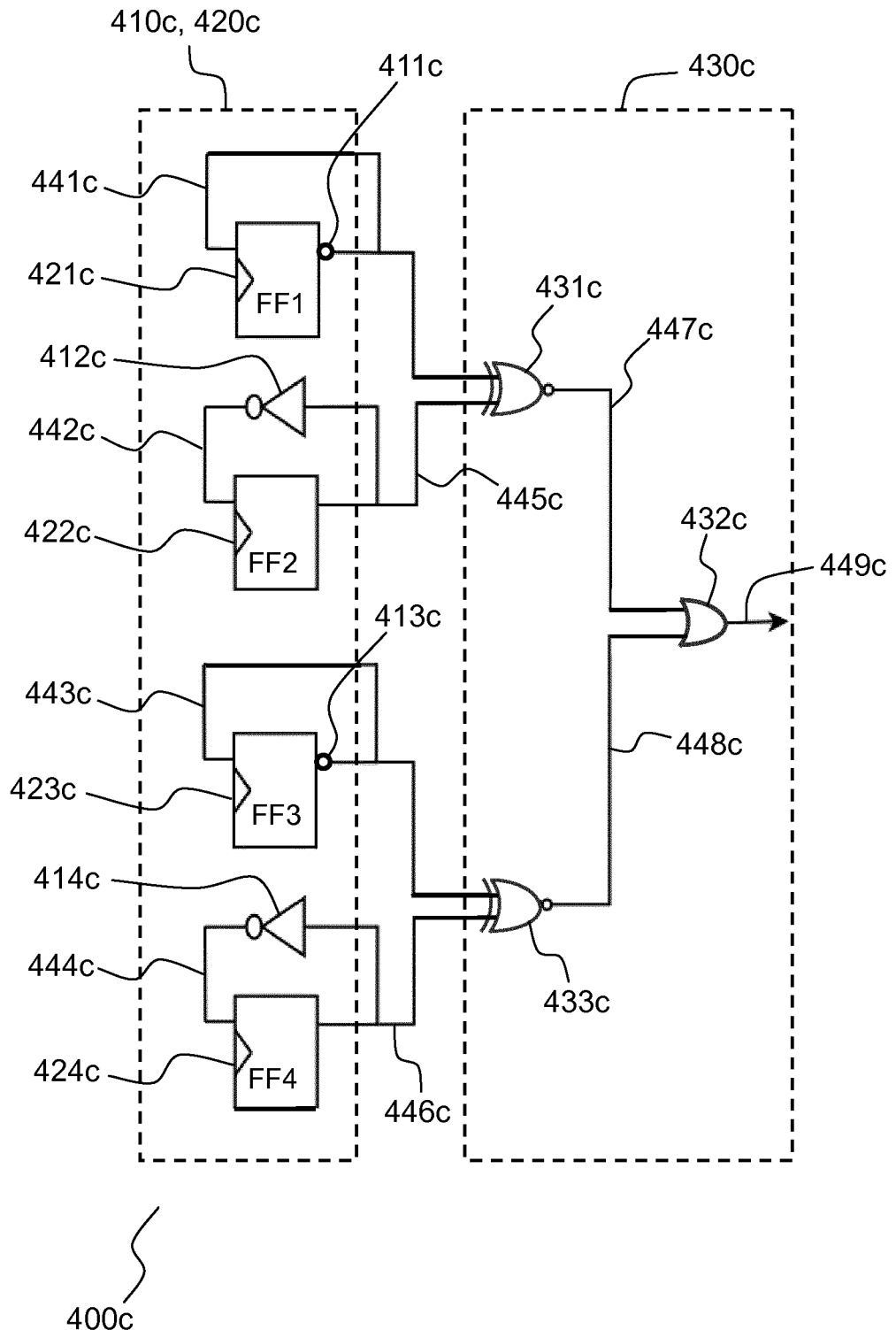

FIGS. 4a, 4b and 4c respectively shows three examples of fault injection attack detection clusters, according to some embodiments.

In a number of embodiments of the invention, the fault injection detection cluster comprises at least one FF whose output is negated then connected to its input. This allows a generation of an alternative signal, which changes its value between 0 and 1, at each clock signal, without needing any input. This alternative signal can, afterwards, be used as input to other FFs and/or as input to the processing logics to generate an alarm signal.

This allows the landmine to be independent of any input. For example, this allows placing the landmines in locations of the circuit wherein no digital input is available. It also uses a FF for both generating and storing allowed sequences of bits, thus requiring less FFs for the fault injection detection cluster.

The FIGS. 4a, 4b and 4c provide examples of such fault injection detection cluster. However, they are provided by means of example only, and other fault injection detection clusters could be defined with such FFs autonomously creating signal oscillating at each clock cycle.

In a number of embodiments of the invention, the output of such a FF generating an oscillating signal is provided as input to at least one other FF of the fault injection detection cluster. Thus sequences of bits can be generated and stored on a plurality of FFs autonomously, without needing an external input.

Such a design is also robust to compilation optimization. Indeed, ICs such as the IC 100 are often designed using high level languages. A high level design provides a number of advantages: it renders the design of ICs easier and faster. It also allows performing high level verifications of the circuit, such as verification that the aim function of the circuit is fulfilled, or that target timings are met. Compilers of high level languages also perform optimization of circuits, for example to remove redundancies. A fault injection cluster design comprising such a FF generating an oscillating signal is provided as input to at least one other FF provides the advantage of being robust to compilation optimization: a compiler will detect that, upon each clock, the FFs are intended to exhibit different values. On the other hand, circuits wherein different FFs receive the same external input (with the objective of introducing a redundancy, in order to detect if one of the two FFs was attacked) may be subject to unwanted compiler optimizations, if the compiler detects and deletes the redundancy.

Therefore, a fault injection detection cluster design, wherein the output of a first FF is negated and provided as input of the first FF to generate an oscillating signal, and wherein the output of the first FF is provided as input to at least one other FF provides the advantage of allowing to place the fault injection detection cluster anywhere in the circuit, independently of the presence of digital inputs, while allowing the use of high level language compilers and being robust to unwanted compiler optimizations.

More specifically, FIG. 4a shows a first example of a fault injection attack detection cluster, according to one embodiment. As shown in FIG. 4a, the fault attack detection cluster 400a is formed of two FFs 421a and 422a, a NOT logical gate 411a, and a XNOR logical gate 430a.

The output of the first FF 421a is connected to the input of the second FF 422a, and to the input of the NOT logical gate 411a. The output of the NOT logical gate 411a is connected to the input of the first FF 421a. The outputs of the first and second FFs 421a and 422a are respectively connected to the inputs of the XNOR logical gate 430a.

The FFs 421a and 422a are synchronized through a clock. The clock can be either the same clock as the clock used for running the cryptographic algorithm, or a different one. At each clock signal, for example on the rising edge of the clock signal, each FF may take the value that is present at its input, and then send such value as output. Therefore, the combination of FFs and logical gates auto-generate sequences of bits at each clock signal, depending on the preceding sequence.

It should be noted that:
the FF 421a and the NOT logical gate 411a form the processing logic 410a configured to generate the sequences of bits (also called "sequence generator");
the FFs 421a and 422a are the FFs 420a used to store the sequences of bits;
the XNOR logical gate 430a is the processing logic configured to generate a signal ($S_A$) indicating the occurrence of a fault injection attack if a sequence of bits defined by the bits stored by the FFs 420a does not belong to the set of allowed sequences.

Thus, the FF 421a is used at the same time to generate (in combination with the NOT logical gate 411a) and store bit sequences. Such design is advantageous in that it provides a low cost solution to generate and store sequences of bits. As noted above, this also allows generating oscillating input signal serving as a basis to the set of allowed sequences, without requiring an external input.

In connection with the sequences of bits that are generated by the fault attack detection cluster, without and with a fault injection attack, the following bit values are defined, at successive clock signals:
the value 441a at the output of the first FF 421a, which is also the value stored by the FF 421a, the input of the second FF 422a, and an input of the XNOR logical gate 430a;
the value 442a at the input of the first FF 421a, which thus corresponds to the application of the NOT logical gate 411a to the bit value 441a;
the value 443a at the output of the FF 422a, which is also the value stored by the FF 422a and an input of the XNOR logical gate 430a;
the value 444a at the output of the XNOR logical gate 430a.

In the absence of a fault injection attack, the values of bits, at successive clock cycles, may comprise:

TABLE 1

Sequences of bits at successive clock cycles without attack

| Clock cycle | Bit value 441a | Bit value 442a | Bit value 443a | Bit value 444a |
|---|---|---|---|---|
| 1 | 0 | 1 | 1 | 0 |
| 2 | 1 | 0 | 0 | 0 |
| 3 | 0 | 1 | 1 | 0 |
| 4 | 1 | 0 | 0 | 0 |

As shown in Table 1, the sequence formed by the bits stored by the FFs 421a and 422a is, if not attack is performed, is always (1,0) or (0,1). Such two sequences form the allowed sequences, with a Hamming distance equal to 2. The XNOR logical gate 430a is configured to receive such values as input and to always output a value 444a equal to 0 when the bit values (441a, 443a) stored in the FFs belong to the allowed sequences.

Assuming that a fault injection attack has been performed on the first FF 421a at cycle 3, for example by using a laser fault injection attack, the bit stored by FF 421a is then flipped to 1, and the values of bits comprise:

TABLE 2

Sequences of bits at successive clock cycles with attack of FF 421a at the third cycle

| Clock cycle | Bit value 441a | Bit value 442a | Bit value 443a | Bit value 444a |
|---|---|---|---|---|
| 1 | 0 | 1 | 1 | 0 |
| 2 | 1 | 0 | 0 | 0 |
| 3 + attack FF 421a | 1 | 1 | 1 | 1 |

At the $3^{rd}$ cycle, the sequence of bits thus becomes (1,1), which does not belong to the allowed sequences. The bit value 444a at the output of the XNOR gate 430a becomes 1 instead of 0, thereby indicating that a fault injection attack occurred.

Assuming that that a fault injection attack has been performed on the second FF 422a at cycle 3, for example by using a laser fault injection attack, the bit stored by FF 422a is then flipped to 0, and the values of bits comprise:

TABLE 3

Sequences of bits at successive clock cycles with attack of FF 422a at the third cycle

| Clock cycle | Bit value 441a | Bit value 442a | Bit value 443a | Bit value 444a |
|---|---|---|---|---|
| 1 | 0 | 1 | 1 | 0 |
| 2 | 1 | 0 | 0 | 0 |
| 3 + attack FF 421a | 0 | 1 | 0 | 1 |

At the $3^{rd}$ cycle, the sequence of bits thus becomes (0,0), which does not belong to the allowed sequences. The bit value 444a at the output of the XNOR gate 430a also becomes 1 instead of 0, thereby indicating that a fault injection attack occurred.

Such example shows that, if one of the FFs 421a or 422a is hit by a fault injection attack, the bit value 444a necessarily becomes 1 instead of 0. Therefore, the bit value 444a equal to 1 is a signal $S_A$ indicating that a fault injection attack has been performed.

The fault injection attack detection cluster, according to such embodiments, provides a number of advantages including without limitation the following advantages:
- it does not generate false positive alarms: the bit value 444a is always 0 in the absence of a fault injection in the bit value 441a or 443a;
- it forms a low-cost solution without requiring for large sensors to operate;
- it does not require any calibration phase;
- the FFs 421a and 422a can be interleaved with FFs used for running cryptographic algorithms; therefore it is impossible for an attacker to know the FFs that are used for cryptography or attack detection, and even to identify if some FFs are used for attack detection;
- it will raise an alarm signal $S_A$ (in this example, if 444a=1) if any of the two FFs 421a and 422a is hit by a fault injection; an attack may eventually remain undetected if both FFs are hit in the same time, although such case is very unlikely;
- a plurality of fault injection attack detection clusters such as the cluster 400a may be placed in the IC and their output can be combined into a single alarm, for example by being combined using OR gates. Therefore, a global signal alarm can be issued that will indicate if any FF of the fault injection attack detection cluster has been hit, whatever their number. This allows setting a desired number of landmine FFs for detecting fault injection attack. A laser fault injection attack requires performing a number of preliminary attacks to identify the most sensitive FFs. The number of landmine FFs can thus be defined so as to have a high probability that an attacker hits at least one landmine FF during the calibration phase of the attack.

FIG. 4b shows a second example of a fault injection attack detection cluster, according to some embodiments. The cluster 400b is similar to the cluster 400a, with a higher number of components including the following components:
- a set 420b of three FFs 421b, 422b, and 423b for storing sequences of 3 bits;
- processing logics 410b configured to generate one or more sequences of bits belonging to a set of allowed sequences comprising the FF 421b, and a first NOT gate 411b;
- a set 430b of processing logics configured to generate a signal ($S_A$) indicating the occurrence of a fault injection attack, if a sequence of bits defined by the bits stored by the two or more FFs of the set does not belong to the set of allowed sequences, and comprising a second NOT gate 431b, a NOR gate 432b, a AND gate 433b, and a XNOR gate 434a.

The components of the cluster are interconnected in the following way:
- the output of the first FF 421b is connected to the inputs of the first NOT gate 411b, of the second NOT gate 432b, of the second FF 422b and of the third FF 423b;
- the output of the first NOT gate 431b is connected to the input of the first FF 421b;
- the output of the second FF 422b is connected to the inputs of the NOR gate 432b and of the AND gate 433b;
- the output of the second NOT gate 431b is connected to inputs of the NOR gate 432b and of the AND gate 433b;
- the output of the third FF 423b is connected to inputs of the NOR gate 432a and of the AND gate 433b;
- the outputs of the NOR gate 432a and the AND gate 433b are connected to inputs of the XNOR gate 434b.

Sequences of bits are thus generated at each clock cycle. The following bit values in the cluster will be verified at each clock cycle, without and with fault injection attack:
- the value 441b at the output of the first FF 421b (which is also the value stored by the FF 421b, and the value at the input of the first and second NOT gates 411b and 431b, and the second and third FFs 422b and 423b);
- the value 442b, at the output of the first NOT gate 411b and the input of the first FF 421b;
- the value 443b at the output of the second FF 422b, an input of the NOR gate 432b and AND gate 433b, which is also the value stored by the second FF 422b;
- the value 444b at the output of the second NOT gate 431b, an input of the NOR gate 432a and AND gate 433b;
- the value 445b at the output of the third FF 423b, an input of the NOR gate 432a and AND gate 433b, which is also the value stored by the third FF 423b;
- the value 446b at the output of the NOR gate 432b, and an input of the XNOR gate 434b;
- the value 447b at the output of the AND gate 433b, and an input of the XNOR gate 434b;

the value 448b at the output of the XNOR gate 434b.

The bits values thus take the following values at successive clock cycles, in the absence of attack:

TABLE 4

Sequences of bits at successive clock cycles without attack

| Clock Cycle | Bit 441b | Bit 442b | Bit 443b | Bit 444b | Bit 445b | Bit 446b | Bit 447b | Bit 448b |
|---|---|---|---|---|---|---|---|---|
| 1 | 0 | 1 | 1 | 1 | 1 | 0 | 1 | 0 |
| 2 | 1 | 0 | 0 | 0 | 0 | 1 | 0 | 0 |
| 3 | 0 | 1 | 1 | 1 | 1 | 0 | 1 | 0 |
| 4 | 1 | 0 | 0 | 0 | 0 | 1 | 0 | 0 |

It should be noted that the sequences formed by the bits (441b, 443b, 445b) belong, in the absence of attack, to a set of two allowed sequences, (0,1,1) and (1,0,0), which are complementary. The Hamming distance between these two allowed sequences is 3. The bit 448b is always equal to 0 if these allowed sequences are met.

In a case of a fault injection attack of the first FF 421b, second FF 422b and third FF 423b at the $3^{rd}$ cycle, the sequence become respectively:

TABLE 5

Sequences of bits at successive clock cycles with attack of the first FF 421b at cycle 3

| Clock Cycle | Bit 441b | Bit 442b | Bit 443b | Bit 444b | Bit 445b | Bit 446b | Bit 447b | Bit 448b |
|---|---|---|---|---|---|---|---|---|
| 1 | 0 | 1 | 1 | 1 | 1 | 0 | 1 | 0 |
| 2 | 1 | 0 | 0 | 0 | 0 | 1 | 0 | 0 |
| 3 | 1 | 0 | 1 | 0 | 1 | 0 | 0 | 1 |

TABLE 6

Sequences of bits at successive clock cycles with attack of the second FF 422b at cycle 3

| Clock Cycle | Bit 441b | Bit 442b | Bit 443b | Bit 444b | Bit 445b | Bit 446b | Bit 447b | Bit 448b |
|---|---|---|---|---|---|---|---|---|
| 1 | 0 | 1 | 1 | 1 | 1 | 0 | 1 | 0 |
| 2 | 1 | 0 | 0 | 0 | 0 | 1 | 0 | 0 |
| 3 | 0 | 1 | 0 | 1 | 1 | 0 | 0 | 1 |

TABLE 7

Sequences of bits at successive clock cycles with attack of the third FF 423b at cycle 3

| Clock Cycle | Bit 441 | Bit 442b | Bit 443 | Bit 444b | Bit 445b | Bit 446b | Bit 447b | Bit 448b |
|---|---|---|---|---|---|---|---|---|
| 1 | 0 | 1 | 1 | 1 | 1 | 0 | 1 | 0 |
| 2 | 1 | 0 | 0 | 0 | 0 | 1 | 0 | 0 |
| 3 | 0 | 1 | 1 | 1 | 0 | 0 | 0 | 1 |

Accordingly, in each possible attack, the sequence of bits (441b, 443b, 445b) does not belong to the set of allowed sequences and the bit 448b takes the value 1, which is the alarm signal $S_A$. To be undetected, the attack would require hitting at the same time the FFs 421b, 422b and 423b, which is virtually impossible as it would require performing a synchronized fault injection attack using three laser beams, and attacking at the same time the three FFs 421b, 422b and 423b without any a priori knowledge of the FFs that are used for cryptography or attack detection.

FIG. 4c shows a third example of a fault injection attack detection cluster, according to some embodiments.

In a number of embodiments of the invention, the fault injection detection cluster comprises a plurality of FFs connected on the same clock signal, the output of each of the FFs being respectively negated and connected to its input. Thus, each FF of the fault injection detection cluster independently generates a signal which oscillates, at each clock cycle, between 0 and 1. The set of allowed sequences thus comprises only two allowed sequences, the first allowed sequence being the complement of the second allowed sequence. If one of the FFs of the fault injection detection cluster is hit, the whole sequence will not belong anymore to one of the two allowed sequences. This can be detected, for example using a combination of logical gates on the output of the FFs, to raise an alarm signal.

Such a design provides a number of advantages:
- no external input signal is needed, provided that each FF generates its own oscillating input;
- the Hamming distance of the set of allowed sequence is equal to the number of FFs in the fault injection cluster. The fault injection detection cluster can thus be tailored to ensure that a target level of complexity of detected attacks is met;
- when a FF is hit by an attack, its value keeps oscillating at each subsequent clock cycle. Thus, at the subsequent cycles, its value will remain unsynchronized with the values of the other FFs of the fault injection detection cluster, and the alarm signal will remain active;
- provided that the FFs are synchronized in the same clock signal, they remain permanently synchronized on one of the two allowed sequences, unless one of the FFs is hit by an attack. Since the outputs of the FFs can be combined using logical gates to detect if they exhibit one of the two allowed sequences, an attack can be detected without delay: as early as one of the FFs is hit by an attack, the combination of the outputs of the FFs raises an alarm signal. The alarm 449c is thus raised in less than one clock period.

The FIG. 4c shows a cluster 400c, which is provided by means of example only of a cluster comprising a plurality of FFs connected on the same clock signal, the output of each of the FFs respectively having its input negated and connected to its input.

The cluster 400c comprises the following components:
- a set 420c of four FFs 421c, 422c, 423c and 424c storing sequences of 4 bits;
- processing logics 410c configured to generate one or more sequences of bits belonging to a set of allowed sequences and comprising the four FFs 421c, 422c, 423c and 424c, a first NOT gate 412c and a second NOT gate 414c. The bit at the output of the first FF 421c is inversed 411c, and the bit at the output of the third FF 423c is inversed 413c, that is to say the FFs 421c and 423c output a bit which is the inverse of the bit that is stored. Since the outputs of the FFs 421c and 423c are connected to their respective inputs, the values of the bits stored by the DDs 421c and 423c are inversed at each clock cycle;
- a set 430c of processing logics configured to generate a signal ($S_A$) indicating the occurrence of a fault injection attack if a sequence of bits defined by the bits stored by the two or more FFs of the set 420c does not belong to the set of allowed sequences and comprising a first XNOR gate 431c, a second XNOR gate 433c, and an OR gate 432c.

The components of the cluster are interconnected in the following way:

due to the inversion 411c, the output of the first FF 421c is the inverse of the value stored within the first FF 421c, and it is connected to the inputs of the first FF 421c, and first XNOR gate 431c;

the output of the second FF 422c is connected to the inputs of the first NOT gate 412c, and the first XNOR gate 431c;

due to the inversion 413c, the output of the third FF 423c is the inverse of the value stored within the third FF 423c, and it is connected to the inputs of the third FF 423c, and second XNOR gate 433c;

the output of the fourth FF 424c is connected to the inputs of the second NOT gate 414c, and the second XNOR gate 433c;

the output of the first NOT gate 412c is connected to the input of the second FF 422c;

the output of the second NOT gate 414c is connected to the input of the fourth FF 424c the output of the first XNOR gate 431c and the second XNOR gate 433c are connected to the inputs of the OR gate 432c.

Sequences of bits are thus generated at each clock cycle. The following bit values in the cluster will be verified at each clock cycle, without and with fault injection attack:

the value 441c at the output of the first FF 421c (which is also the inverse of the value stored by the FF 421c, and the value at the input of the first FF 411c and the first XNOR gate 431c);

the value 442c at the output of the first NOT gate 412c and the input of the second FF 422c;

the value 443c at the output and the input of the third FF 423c. The value 443c is thus the inverse of the value stored within the third FF 423c;

the value 444c at the output of the second NOT gate 414c, and the input of the fourth FF 424c;

the value 445c at the output of the second FF 422c, and an input of the XNOR gate 431c;

the value 446c at the output of the fourth FF 424c, the input of the second NOT gate 414c, and an input of the second XNOR gate 433c;

the value 447c at the output of the first XNOR gate 431c, and an input of the OR gate 432c;

the value 448c at the output of the second XNOR gate 433c, and an input of the AND gate 432c;

the value 449c at the output of the AND gate 432c.

The bits values thus take the following values at successive clock cycles, in the absence of attack:

TABLE 8

Sequences of bits at successive clock cycles without attack

| Clock Cycle | Bit 441c | Bit 442c | Bit 443c | Bit 444c | Bit 445c | Bit 446c | Bit 447c | Bit 448c | Bit 449c |
|---|---|---|---|---|---|---|---|---|---|
| 1 | 1 | 1 | 1 | 1 | 0 | 0 | 0 | 0 | 0 |
| 2 | 0 | 0 | 0 | 0 | 1 | 1 | 0 | 0 | 0 |
| 3 | 1 | 1 | 1 | 1 | 0 | 0 | 0 | 0 | 0 |
| 4 | 0 | 0 | 0 | 0 | 1 | 1 | 0 | 0 | 0 |
| 5 | 1 | 1 | 1 | 1 | 0 | 0 | 0 | 0 | 0 |

For the sake of simplicity, the sequences of bits will be defined as the bits at the output of the four FFs, (441c, 443c, 445c, 446c), even though the bits 445c and 446c at the output of the second FF 422c and fourth FF 424c are actually the inverse of the bits stored within the FFs.

It should be noted that the sequences formed by the bits (441c, 443c, 445c, 446c) belong, in the absence of attack, to a set of two allowed sequences: (1, 1, 0, 0) and (0, 0, 1, 1) which are complementary. The Hamming distance between these two allowed sequences is 4. The bit 449b is always equal to 0 if these allowed sequences are met.

In a case of a fault injection attack of the first FF 421c, second FF 422c, the third FF 423c and the fourth FF 424c at the $3^{rd}$ cycle, the sequence becomes respectively:

TABLE 9

Sequences of bits at successive clock cycles with attack of the first FF 421c at cycle 3

| Clock Cycle | Bit 441c | Bit 442c | Bit 443c | Bit 444c | Bit 445c | Bit 446c | Bit 447c | Bit 448c | Bit 449c |
|---|---|---|---|---|---|---|---|---|---|
| 1 | 1 | 1 | 1 | 1 | 0 | 0 | 0 | 0 | 0 |
| 2 | 0 | 0 | 0 | 0 | 1 | 1 | 0 | 0 | 0 |
| 3 | 0 | 1 | 1 | 1 | 0 | 0 | 1 | 0 | 1 |
| 4 | 1 | 0 | 0 | 0 | 1 | 1 | 1 | 0 | 1 |
| 5 | 0 | 1 | 1 | 1 | 0 | 0 | 1 | 0 | 1 |

TABLE 10

Sequences of bits at successive clock cycles with attack of the second FF 422c at cycle 3

| Clock Cycle | Bit 441c | Bit 442c | Bit 443c | Bit 444c | Bit 445c | Bit 446c | Bit 447c | Bit 448c | Bit 449c |
|---|---|---|---|---|---|---|---|---|---|
| 1 | 1 | 1 | 1 | 1 | 0 | 0 | 0 | 0 | 0 |
| 2 | 0 | 0 | 0 | 0 | 1 | 1 | 0 | 0 | 0 |
| 3 | 1 | 0 | 1 | 1 | 1 | 0 | 1 | 0 | 1 |
| 4 | 0 | 0 | 0 | 0 | 0 | 1 | 1 | 0 | 1 |
| 5 | 1 | 0 | 1 | 1 | 1 | 0 | 1 | 0 | 1 |

TABLE 11

Sequences of bits at successive clock cycles with attack of the third FF 423c at cycle 3

| Clock Cycle | Bit 441c | Bit 442c | Bit 443c | Bit 444c | Bit 445c | Bit 446c | Bit 447c | Bit 448c | Bit 449c |
|---|---|---|---|---|---|---|---|---|---|
| 1 | 1 | 1 | 1 | 1 | 0 | 0 | 0 | 0 | 0 |
| 2 | 0 | 0 | 0 | 0 | 1 | 1 | 0 | 0 | 0 |
| 3 | 1 | 1 | 0 | 1 | 0 | 0 | 0 | 1 | 1 |
| 4 | 0 | 0 | 1 | 0 | 1 | 1 | 0 | 1 | 1 |
| 5 | 1 | 1 | 0 | 1 | 0 | 0 | 0 | 1 | 1 |

TABLE 12

Sequences of bits at successive clock cycles with attack of the fourth FF 424c at cycle 3

| Clock Cycle | Bit 441c | Bit 442c | Bit 443c | Bit 444c | Bit 445c | Bit 446c | Bit 447c | Bit 448c | Bit 449c |
|---|---|---|---|---|---|---|---|---|---|
| 1 | 1 | 1 | 1 | 1 | 0 | 0 | 0 | 0 | 0 |
| 2 | 0 | 0 | 0 | 0 | 1 | 1 | 0 | 0 | 0 |
| 3 | 1 | 1 | 1 | 0 | 0 | 1 | 0 | 1 | 1 |
| 4 | 0 | 0 | 0 | 0 | 1 | 0 | 0 | 1 | 1 |
| 5 | 1 | 1 | 1 | 0 | 0 | 1 | 0 | 1 | 1 |

Accordingly, in each possible attack, the sequence of bits (441c, 443c, 445c, 446c) does not belong to the set of allowed sequences, and the bit 449c takes the value 1, which is the alarm signal $S_4$. The attack would require hitting at the same time the FFs 421c, 422c, 423c and 424b in order to be undetected, which is virtually impossible, as it would require performing a synchronized fault injection attack using fourth laser beams, and attacking at the same time the four FFs 421c, 422c, 423c and 424c without any a priori knowledge of the FFs that are used for cryptography or attack detection.

As noted above, once a FF has been hit an alarm is raised without delay Moreover, the value of the hit FF remains unsynchronized with the others over subsequent cycles, and the alarm signal remains triggered at each clock cycle. The skilled man can define, for each combination of possible allowed sequences, a combination of logical gates to test if the FFs exhibit one of the two possible allowed sequences.

The cluster 400c is provided by means of example only of a cluster comprising a plurality of FFs connected on the same clock signal, each of the FFs respectively having its output negated and connected to its input. Other clusters of the same type, having different numbers of FFs, can be defined. For example, the FFs 421c, 422c, combined with the logical gates 411c, 412c, 431c can be used, as such, as a fault injection detection cluster having two FFs, the signal 447c taking the value 1 only if one of the two FFs 421c, 422c has been hit.

It should be noted that FIGS. 4a to 4c are non-limiting examples provided to illustrate the generation of sequences of bits that belong to a set of allowed sequences, and the use of logic gates to verify if the sequence belong to the set of allowed sequences, in order to verify if a fault injection attack has been performed, according to embodiments of the invention.

The skilled person will readily understand that other fault attack detection cluster of the same type are encompassed by the invention, using a combination of FFs and/or logic gates to perform an automatic generation and verification of sequences.

Advantageously, the set of allowed sequences may comprise only two allowed sequences, the first sequence of the set being the complement of the second sequence of the set, as depicted for example in FIGS. 4a to 4c. Thus, in such embodiments, the Hamming distance between the two allowed sequences is equal to the number of bits in the sequences (i.e, the number of FFs) and an alarm may be raised if any of the FF is hit, an attack being undetected only if it hits all the FFs at the same time, which is highly unlikely, even with a set of two FFs, and becomes virtually impossible as the number of FFs increases.

Such kind of fault attack detection clusters may advantageously comprise at least one FF whose input is, at each cycle, the complement of its output. The bit stored in the FF being updated to take the value of the input at each clock cycle, this advantageously provides a simple and efficient way to alternate the value stored in the FF at each clock cycle (this is for example the case of the FFs 421a, 421b, 421c, 422c, 423c, and 424c).

Although the signal $S_A$ indicating the occurrence of the attack is defined by an output bit equal to 1 in the above description of some embodiments, it should be noted that the invention is not restricted to such definition and encompasses any suitable definition of the signal $S_A$.

Figure 5:
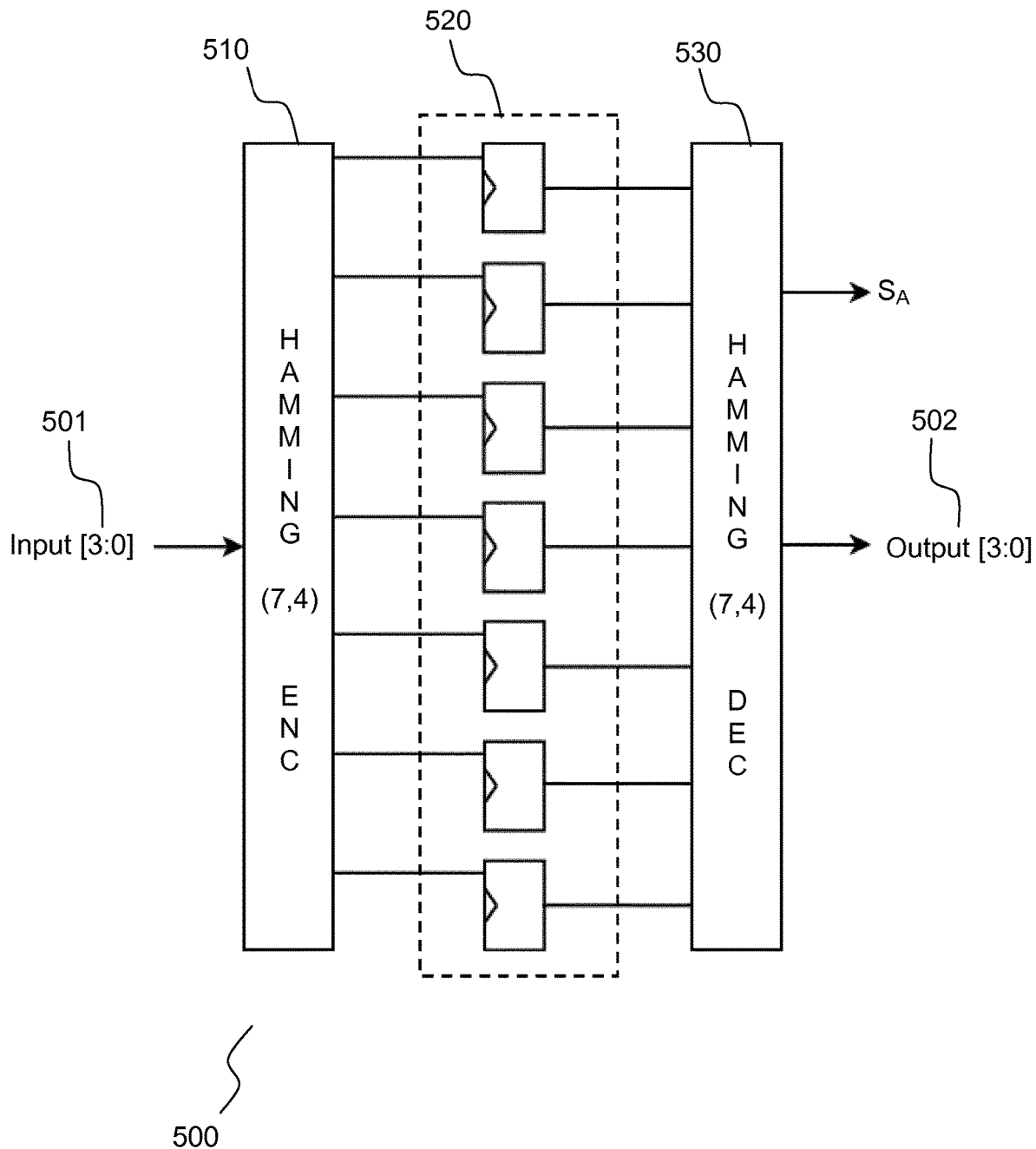
FIG. 5 depicts an example of a fault injection attack detection cluster using an error correcting code, in an embodiment of the invention.

FIG. 5 depicts an example of a fault injection detection cluster using an error correcting code according to an embodiment of the invention.

As shown in FIG. 5, the cluster 500 receives as input a set of four bits 501. The set of four bits 501 is processed by a Hamming encoder (7,4) 510 that adds 3 redundancy bits, and encodes the set of four bits on 7 bits, respectively stored on 7 FFs 520. The output of the FFs 520 is processed by a Hamming decoder (7,4): if no attack has been performed, no error is found in the bits stored by the FFs 520 and a set of bits 502, identical to the set of bits 501, is sent as output.

In contrast, if a fault injection attack has been performed, resulting in a bit flip of any of the FFs of the set 520, the Hamming decoded will detect that an error occurred, and raise an alarm signal $S_A$.

Due to the redundancy introduced by the Hamming encoder, an attack can be undetected only if at least four of the FFs of the set 520 are hit, which is, as previously noted, virtually impossible. The size of the input/output sets of bits, and/or the number of redundancy bits can be set to define the Hamming distance of the sequences generated by the Hamming encoder.

In the example of FIG. 5:
the Hamming encoder 510 generates sequences of bits that belong to a set of allowed sequences (i.e, the sequences for which no error is found);
the FFs of the set 520 store the sequences of bits;
if at least one of the FFs of the set 520 is hit by a fault injection attack resulting in a bit flip, the sequence stored does not belong anymore to the set of allowed sequence;
the Hamming decoder 530 detects if there is an error in the code defined by sequence of bits stored in the set of FFs 520. If it is the case, the sequence of bits stored in the set of FFs 520 does not belong to the set of allowed sequences, a fault injection attack has been performed, and an alarm signal $S_A$ is raised.

Although the fault injection attack detection cluster according to the invention can be implemented using a Hamming encoder and decoder, it should be noted that the invention is not restricted to such implementation and that and any suitable error correcting code can be used instead of the Hamming code.

In addition, the embodiment of FIG. 5 provides the advantage that the input and output signals 501, 502 may advantageously be part of the cryptographic algorithm. Thus, the set of FFs 520 can be used to store bit data used by the cryptographic process. The size of the input 501, output 502, and set of FFs 520, and thus the number of redundancy bits can also be modified.

Other embodiments are also available. For example, if the circuit is used to generate a state machine defined by a plurality of binary values, which can take only a subset of the possible values, the values defining the state of the state machine can be provided as input to the FFs, and a test can be performed, whether the FFs exhibit or not one of the possible states of the state machine. Thus, the computation performed by the circuit can be re-used as input for landmine FFs.

Figure 6A:
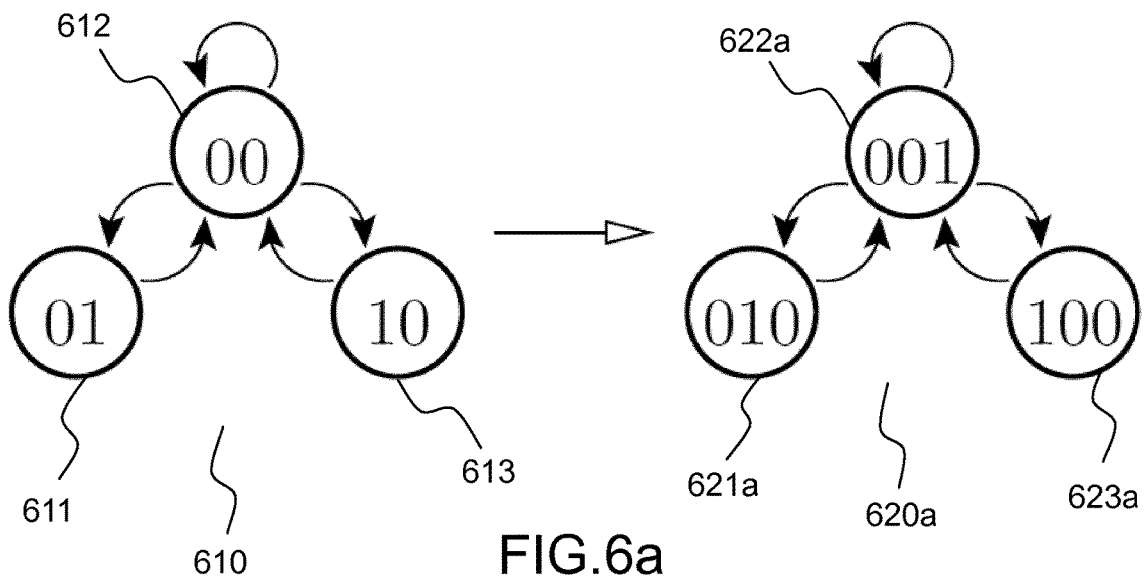
FIGS. 6a and 6b depicts respectively two examples of a fault injection attack detection cluster using a finite state machine, in some embodiments of the invention.
Figure 6B:
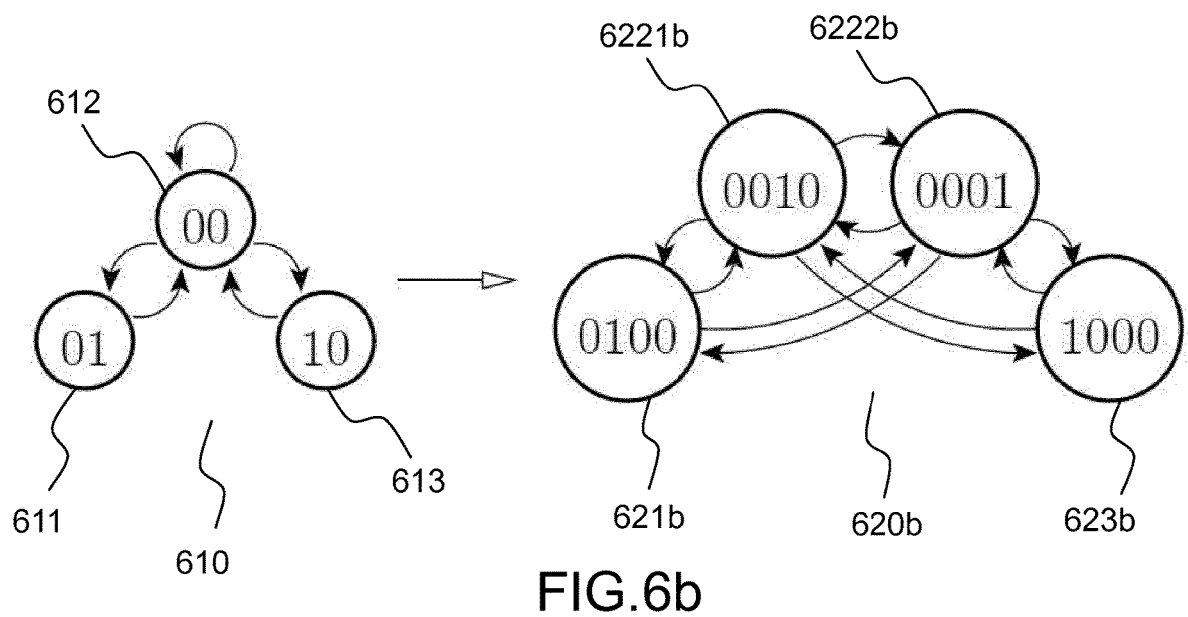

FIGS. 6a and 6b depicts respectively two examples of a fault injection attack detection cluster using a finite state machine, in some embodiments of the invention.

In FIG. 6a, the IC is configured to use a FSM 610 which is part of the calculations performed by the IC, configured to switch between three states 611a, 612a and 613a. The states are defined by the values of two FFs. The three defined states correspond respectively to values "0,1", "0,0", and "1,0". In a number of embodiments of the invention, a further FF is added to the FSM 610, and the values of possible states are enriched by a parity bit. Therefore, the FSM 610 is transformed into a FSM 620a, and the three states 611a, 612a and 613a respectively become three states 621a, 622a and 623a corresponding respectively to the values "0,1,0", "0,0,1" and "1,0,0". Therefore, in each case the value of the third bit corresponds to a parity bit, equal to 1 if the sum of the two others is even, and equal to 0 is the sum of the two other is uneven. The value of the parity bit is thus updated each time the value of one of the two other bits is changed, and will be equal to the relevant parity bit unless a fault injection attack hit one of the FFs. Therefore, this allows checking if an attack occurred while using the calculation currently performed by the IC.

Stated otherwise and using the general structure of FIG. 3, in this example, the state part 320 is a merge between the functional state-machine (example of a three-state machine with states 00, 01, 10) and only one additional FF for the lasermine. It is added to extend the state encoding by parity, therefore states are now encoded as 001, 010 and 100, which have the property that in any sequence of transitions between stats, the check module 330 shall see a Hamming weight one word. Any deviation indicates a fault injection, and an alarm shall be raised In FIG. 6b, the same principle is used, but the FSM 610 is transformed into a FSM 620b with two parity bits instead of 1: the states 611 and 613, for which the sum of bits is uneven are respectively transformed into states 621b and 623b with two additional "0" bits. Meanwhile the state 612, whose sum of bits is equal to 0, is split into two states 6221b, 6222b, with two additional bits "1" and "0". Therefore, for each of the two states, there is a "1" parity bit in absence of attack, and this property can be checked to raise an alarm. Here again, this uses the existing calculation of the IC to detect attacks. Moreover, the addition of a second parity bit renders the detection even more sensitive, because there are more chances that one FF is hit.

Stated otherwise, State-machines can be stuck for a long period of time in a given state, say state 00. Therefore, it is also possible to duplicate such state into two states which are equivalent, and alternate if the logic computes that there is no need for functional state transition. The resulting encoding can still enjoy the property of Hamming weight one, at the cost of adding one more FF in the landmine. Now, each transition is active at each clock cycle, and states are equivalent (0010 and 0001), plus 2 functional states 0100 and 1000.

The FIGS. 4a to 4c, as well as the FIGS. 5, 6a and 6b, are provided by means of example only of embodiments of the invention. More generally, the invention is applicable to any kind of generation of sequences belonging to a set of allowed sequence, storing of the sequences using FFs, and detection whether the FFs exhibit one of the allowed sequences.

It should be noted that a plurality of clusters can be used and combined, and/or a plurality of alarms can be combined within a single one, for example using OR gate, in order for a combined alarm signal to be activated if at least one cluster has been hit by an attack.

Figure 7:
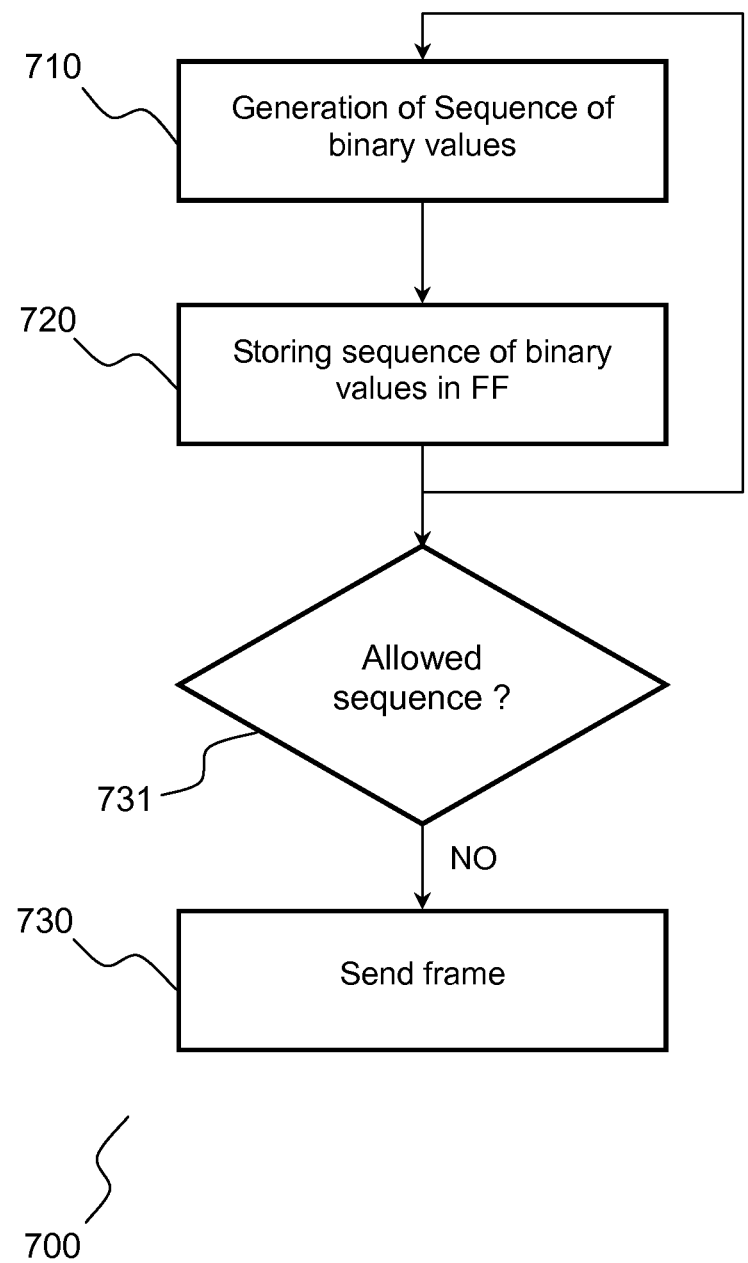
FIG. 7 displays an example of a fault injection attack detection method in a number of embodiments of the invention.

FIG. 7 depicts a method of detecting fault injection attacks, according to some embodiments of the invention.

The method (block 700) comprises a first step 710 of generating one or more sequences of bits belonging to a set of allowed sequences.

In step 720, the sequences of bits are stored in a set of Flip-Flops comprising two or more Flip-Flops.

In step 730, a signal $S_A$ is generated, the signal $S_A$ indicating the occurrence of a fault injection attack if a sequence of bits defined by the bits stored by the two or more FFs of the set, does not belong to the set of allowed sequences.

The method 700 can further comprise a verification step 731, to verify whether the sequence of bit stored in the FF belongs to the allowed sequences, and if so proceeds with step 730.

The embodiments described with reference to FIGS. 4a to 4c, and 5 are respectively implementable by the method 700.

The invention may be also implemented as a computer program configured to perform cryptographic operations. Such a computer program may be attacked by fault injection attacks, if an attacker attacks the registers wherein the bit values used for cryptographic operations are stored. The embodiments described with reference to FIGS. 4a to 4c, and 5 are respectively implementable by such computer program, in order to detect a fault injection attack on the register on which the bit values used for cryptographic operations are stored.

The program code embodied in such computer program is capable of being individually or collectively distributed as a program product in a variety of different forms. In particular, the program code may be distributed using a computer-readable storage medium having computer-readable program instructions thereon for causing a processor to carry out aspects of the embodiments of the invention.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art.

The invention claimed is:

1. A cryptographic integrated circuit (IC) comprising:
   one or more processing logics configured to generate one or more sequences of bits belonging to a set of allowed sequences;
   a set of Flip-Flops (FFs) comprising two or more Flip-Flops configured to store said sequences of bits; and
   one or more processing logics configured to generate a signal ($S_A$) indicating an occurrence of a fault injection attack if a sequence of bits defined by the bits stored by the two or more FFs of the set does not belong to the set of allowed sequences,
   wherein said cryptographic IC comprises at least one first FF having an output connected to an input of at least one second FF and to an input of a NOT logical gate, said NOT logical gate having an output connected to the input of said first FF.

2. The cryptographic integrated circuit (IC) of claim 1, wherein a Hamming distance between two different sequences belonging to the set of allowed sequences is at least equal to two.

3. The cryptographic integrated circuit (IC) of claim 2, wherein the set of allowed sequences comprises two sequences, a first sequence of the set being a complement of a second sequence of the set.

4. The cryptographic integrated circuit (IC) of claim 1, wherein:
   the one or more processing logics configured to generate one or more sequences of bits belonging to a set of allowed sequences comprise said two or more FFs configured to store said sequences of bits, and one or more logical gates connected to generate a different sequence of bits belonging to the set of allowed sequences at each clock cycle; and the one or more processing logics configured to generate a signal ($S_A$) indicating the occurrence of a fault injection attack comprise one or more logical gates configured to perform logical operations to generate a predefined signal if the sequence of bits at the outputs of the two or more FFs configured to store said sequences of bits does not belong to the set of allowed sequences.

5. The cryptographic integrated circuit (IC) of claim 4, wherein at least one of the FFs has an input which is a complement of its output.

6. The cryptographic integrated circuit (IC) of claim 1, comprising:

a first FF and a second FF to store said sequences of bits;

a NOT logical gate; and a XNOR logical gate;

wherein:

the output of the first FF is connected to the input of the NOT logical gate, to the input of the second FF and to a first input of the XNOR logical gate;

the output of the NOT logical gate is connected to the input of the first FF;

the output of the second FF is connected to a second input of the XNOR logical gate; and the signal ($S_A$) indicating the occurrence of a fault injection attack is an output of the XNOR logical gate equal to 1.

7. The cryptographic integrated circuit (IC) of claim 1, comprising a plurality of FFs connected on the same clock signal, the output of each of the FFs being respectively negated and connected to its input.

8. The cryptographic integrated circuit (IC) of claim 1, comprising:

an error-correcting code encoder configured to generate the one or more sequences of bits, the set of allowed sequences comprising error-free codes;

a set of FFs configured to store the one or more sequences of bits at the output of the error-correcting code encoder; and an error-correcting code decoder configured to decode the code stored in the set of FFs and to generate the signal ($S_A$) indicating the occurrence of a fault injection attack if said code stored in the set of FFs comprises an error.

9. The cryptographic integrated circuit (IC) of claim 8, wherein the error-correcting code is a Hamming code.

10. The cryptographic integrated circuit (IC) of claim 1, comprising a security manager configured to modify the output of an execution of a cryptographic algorithm, in response to a reception of the signal ($S_A$) indicating the occurrence of a fault injection attack.

11. The cryptographic integrated circuit (IC) of claim 10, wherein the security manager is configured to count a total number of fault injections, and modify the output of the execution of the cryptographic algorithm, in response to the reception of the signal ($S_A$) indicating the occurrence of a fault injection attack depending on the total number of fault injections.

12. The cryptographic integrated circuit (IC) of claim 11, wherein the security manager is configured to disable the cryptographic integrated circuit (IC), if the total number of fault injections is higher than or equal to a predefined threshold.

13. The cryptographic integrated circuit (IC) of claim 1, wherein it further comprises one or more sensors, configured to detect a global fault injection attack performed on the integrated circuit (IC).

14. The cryptographic integrated circuit (IC) of claim 13, wherein said one or more sensors comprises at least one sensor selected in the group consisting of:

an analog or digital light sensor configured to detect a light or laser fault injection attack;

a voltmeter configured to detect a fault injection attack based on a modification of a voltage of the integrated circuit (IC);

a temperature sensor configured to detect a fault injection attack based on an overheating of the integrated circuit (IC); and a clock sensor configured to detect a fault injection attack based on a modification of the clock of the integrated circuit (IC).

15. A method for detecting a fault injection attack performed on an integrated circuit (IC), said integrated circuit (IC) comprising a set of Flip-Flops (FFs), wherein the method comprises:

generating one or more sequences of bits belonging to a set of allowed sequences;

storing said sequences of bits in a set of said Flip-Flops (FFs) comprising two or more Flip-Flops; and generating a signal ($S_A$) indicating an occurrence of a fault injection attack if a sequence of bits defined by the bits stored by the two or more FFs of the set does not belong to the set of allowed sequences, wherein said IC comprises a cryptographic IC comprising at least one first FF having an output connected to an input of at least one second FF.

16. A computer program product for detecting a fault injection attack performed on an integrated circuit (IC), said integrated circuit (IC) comprising a set of Flip-Flops (FFs), the computer program product comprising:

a non-transitory computer-readable storage medium; and program code stored on the non-transitory computer-readable storage medium that, when executed by one or more processors, causes the one or more processors to:

generate one or more sequences of bits belonging to a set of allowed sequences;

store said sequences of bits in a set of registers comprising two or more registers; and generate a signal ($S_A$) indicating an occurrence of a fault injection attack if a sequence of bits defined by the bits stored by the two or more registers of the set does not belong to the set of allowed sequences, wherein said IC comprises a cryptographic IC comprising at least one first FF having an output connected to an input of at least one second FF.

* * * * *